(12) United States Patent
Tamaki et al.

(10) Patent No.: US 12,352,648 B2
(45) Date of Patent: Jul. 8, 2025

(54) PRELOAD INSPECTION METHOD FOR BEARING DEVICE FOR VEHICLE WHEEL

(71) Applicant: NTN Corporation, Osaka (JP)

(72) Inventors: Shun Tamaki, Shizuoka (JP); Masaaki Hayashi, Shizuoka (JP); Sadayuki Kubota, Shizuoka (JP); Tomoko Baba, Shizuoka (JP)

(73) Assignee: NTN CORPORATION, Osaka (JP)

( * ) Notice: Subject to any disclaimer, the term of this patent is extended or adjusted under 35 U.S.C. 154(b) by 376 days.

(21) Appl. No.: 18/012,758

(22) PCT Filed: Aug. 18, 2021

(86) PCT No.: PCT/JP2021/030253
§ 371 (c)(1),
(2) Date: Dec. 23, 2022

(87) PCT Pub. No.: WO2022/039203
PCT Pub. Date: Feb. 24, 2022

(65) Prior Publication Data
US 2023/0251152 A1   Aug. 10, 2023

(30) Foreign Application Priority Data

Aug. 19, 2020   (JP) ................... 2020-138866
Aug. 19, 2020   (JP) ................... 2020-138867
(Continued)

(51) Int. Cl.
*G01L 5/00*   (2006.01)
*F16C 19/18*  (2006.01)
(Continued)

(52) U.S. Cl.
CPC ............ *G01L 5/0009* (2013.01); *F16C 19/18* (2013.01); *G01L 1/26* (2013.01); *B60B 27/0094* (2013.01);
(Continued)

(58) Field of Classification Search
CPC .......... G01L 5/0009; G01L 1/26; F16C 19/18; F16C 2226/12; F16C 2233/00;
(Continued)

(56) References Cited

U.S. PATENT DOCUMENTS 6,070,325 A      6/2000   Miyata et al.
6,491,440 B1 *  12/2002   Sahashi .................. B60B 27/00
                                                        384/544
(Continued)

FOREIGN PATENT DOCUMENTS

EP   1 970 586    9/2008
EP   3 936 847    1/2022
(Continued)

OTHER PUBLICATIONS

Extended European Search Report issued Dec. 21, 2023 in corresponding European Patent Application No. 21858347.4.
(Continued)

*Primary Examiner* — Francis C Gray
(74) *Attorney, Agent, or Firm* — Wenderoth, Lind & Ponack, L.L.P.

(57) ABSTRACT

The rotational torque inspection method for a bearing device comprises: a press-fitting step (S02); a first bearing preload value calculation step (S03) for calculating a first bearing preload value (P1); a post-press-fit rotational torque measurement step (S05) for measuring a post-press-fit rotational torque (Ta); a crimping step (S06) for crimping the small diameter step part to the inner ring; a post-crimping rotational torque measurement step (S07) for measuring a post-
(Continued)

crimping rotational torque (Tb); a second bearing preload value calculation step (S08) for calculating a second bearing preload value (P2); and a determination step (S09) for determining the suitability of the preload depending on whether or not the second bearing preload value (P2) is within a range of a reference value.

32 Claims, 25 Drawing Sheets

(30) Foreign Application Priority Data

| | | |
|---|---|---|
| Aug. 19, 2020 | (JP) | 2020-138868 |
| Aug. 19, 2020 | (JP) | 2020-138869 |
| Aug. 19, 2020 | (JP) | 2020-138870 |
| Aug. 28, 2020 | (JP) | 2020-144535 |

(51) Int. Cl.
*G01L 1/26* (2006.01)
*B60B 27/00* (2006.01)

(52) U.S. Cl.
CPC ...... *F16C 2226/12* (2013.01); *F16C 2233/00* (2013.01)

(58) Field of Classification Search
CPC ........ F16C 19/186; F16C 25/06; F16C 43/04; F16C 43/086; F16C 35/078; F16C 2229/00; F16C 2326/02; B60B 27/0094; B60B 27/0078; G01M 13/04
See application file for complete search history.

(56) References Cited

U.S. PATENT DOCUMENTS

| | | | | |
|---|---|---|---|---|
| 2016/0069394 | A1* | 3/2016 | Ogata | B60B 27/0078 |
| | | | | 29/898.062 |
| 2018/0087569 | A1* | 3/2018 | Inoue | F16C 33/6614 |
| 2022/0136562 | A1* | 5/2022 | Takubo | F16C 43/04 |
| | | | | 29/894 |
| 2022/0325751 | A1* | 10/2022 | Sakaguchi | B60B 27/0084 |

FOREIGN PATENT DOCUMENTS

| | | | | |
|---|---|---|---|---|
| JP | 10-185717 | | 7/1998 | |
| JP | 2000-009562 | | 1/2000 | |
| JP | 4353870 | | 10/2009 | |
| JP | 2013-198949 | | 10/2013 | |
| JP | 2016-057311 | | 4/2016 | |
| JP | 2020-098163 | | 6/2020 | |
| WO | WO-2022039204 | A1 * | 2/2022 | ............. B21J 9/025 |

OTHER PUBLICATIONS

International Search Report issued Nov. 2, 2021, in International (PCT) Application No. PCT/JP2021/030253, with English translation.

* cited by examiner

PRELOAD INSPECTION METHOD FOR BEARING DEVICE FOR VEHICLE WHEEL

TECHNICAL FIELD

The present invention relates to a preload inspection method for a bearing device for a vehicle wheel.

BACKGROUND ART

Conventionally, a bearing device for a vehicle wheel that rotatably supports a wheel in a suspension device of an automobile or the like is known. In such a bearing device for a vehicle wheel, a preload is applied between a rolling body and a raceway ring constituting the bearing device.

As a preload is applied to the bearing device, rigidity of the bearing device can be increased, and vibration and noise can be suppressed. However, if a preload is excessively applied, it may cause an increase in the rotational torque and a decrease in the life. Therefore, it is important to check whether an appropriate preload is applied to the bearing device.

As a method of checking a preload applied to the bearing device, for example, as disclosed in Patent Literature 1, a preload measurement method, in which a preload gap in an axial direction in a rolling bearing provided with rolling bodies in a plurality of rows is measured to measure a preload applied to the bearing, is known.

In a case of obtaining a preload applied to a bearing from a preload gap, for example, in a bearing device for a vehicle wheel having a specification in which a hub ring is crimped to an inner ring to constitute an inner member, it is possible to obtain a preload applied to the bearing device by converting a pressing amount of the inner ring when the hub ring is crimped into a preload gap decrease amount and combining the preload gap decrease amount and a preload gap before the crimping processing.

Further, in a bearing device having a configuration in which a hub ring is crimped to an inner ring, it is conceivable to measure rotational torque of the bearing device before and after the crimping processing, calculate a preload increase amount from an increase amount of the rotational torque before and after the crimping processing, and calculate a preload applied to the bearing device by adding the preload increase amount to a preload of the bearing device before the crimping processing.

CITATIONS LIST

Patent Literature

Patent Literature 1: JP-A 10-185717 Gazette

SUMMARY OF INVENTION

Technical Problems

However, in a bearing device having a configuration in which a hub ring is crimped to an inner ring, in a case where an abnormality such as shape collapse of an inner ring raceway surface occurs during crimping processing, it is difficult to accurately obtain a preload gap decrease amount from a pressing amount of the inner ring, and reliability of a measurement value of a preload applied to the bearing device may decrease.

Further, rotational torque of a bearing device varies in a measured value even between bearing devices having the same preload gap depending on temperature of the bearing device at the time of measurement. As a result, reliability of a calculated preload may decrease.

Further, immediately after crimping processing, temperature in the vicinity of an inner ring increases due to plastic deformation of a hub ring, and the inner ring expands. Due to this, measured rotational torque shows a value higher than that in a case where measurement is performed in a state where the inner ring is not expanded, and there has been a possibility that measurement accuracy of a preload is affected.

Further, in a case where a preload is calculated using rotational torque before and after crimping processing, determination of appropriateness or inappropriateness of a preload is performed depending on whether or not the preload is within a range of a preset pressurization reference value, and only a large abnormality can be detected. Therefore, there is room for further improving reliability when appropriateness and inappropriateness of a preload are determined.

In view of the above, an object of the present invention is to provide a preload inspection method for a bearing device for a vehicle wheel, in which a preload applied to the bearing device for a vehicle wheel can be inspected with higher reliability. Further, the present invention provides a preload inspection method for a bearing device for a vehicle wheel capable of inspecting a preload applied to the bearing device for a vehicle wheel with higher reliability by taking into account a change in rotational torque due to temperature. Further, an object of the present invention is to provide a preload inspection method for a bearing device for a vehicle wheel capable of suppressing influence of temperature increase due to crimping processing and determining quality of a preload applied to the bearing device for a vehicle wheel with higher accuracy. Further, the present invention provides a preload inspection method for a bearing device for a vehicle wheel capable of further improving reliability when appropriateness or inappropriateness of a preload applied to the bearing device for a vehicle wheel is determined.

Solutions to Problems

That is, a first invention is a preload inspection method for a bearing device for a vehicle wheel including an outer member having a plurality of rows of outer raceway surfaces on an inner periphery, an inner member including a hub ring that has a small-diameter step portion extending in an axial direction on an outer periphery and an inner ring that is press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member. The preload inspection method includes a press-fitting step of press-fitting the inner ring into the small-diameter step portion of the hub ring to a position where the inner ring abuts on the hub ring in the axial direction, a first bearing preload value calculation step of calculating a first bearing preload value of the bearing device for a vehicle wheel based on an axial negative gap between both the raceway surfaces and the rolling body after the press-fitting step, a post-press-fitting rotational torque measurement step of measuring post-press-fitting rotational torque of the bearing device for a vehicle wheel when the inner member and the outer member are relatively rotated after the press-fitting step, a crimping step of crimping an inner-side end portion of the small-diameter step portion to the inner ring after the post-press-fitting rotational torque measurement step, a post-crimping rotational torque measurement step of measuring post-crimping rotational torque of the bearing device for a vehicle wheel when the inner member and the outer member are relatively rotated after the crimping step, a second bearing preload value calculation step of calculating a second bearing preload value by adding, to the first bearing preload value, a preload change amount between after the press-fitting step and after the crimping step, the preload change amount being obtained based on differential torque between the post-press-fitting rotational torque and the post-crimping rotational torque, and a determination step of determining appropriateness or inappropriateness of a preload applied to the bearing device for a vehicle wheel depending on whether or not the second bearing preload value is within a range of a reference value.

According to a second invention, in the first invention, in the second bearing preload value calculation step, the preload change amount is obtained from the differential torque by using a relationship between rotational torque and a preload according to ambient temperature.

According to a third invention, in the first invention, in the second bearing preload value calculation step, the preload change amount is obtained from the differential torque by using a relationship between rotational torque and a preload according to surface temperature of the bearing device for a vehicle wheel.

According to a fourth invention, in the first invention, the preload inspection method for a bearing device for a vehicle wheel according to claim 1 further includes a rotational torque correction step of correcting the post-crimping rotational torque based on a temperature increase amount of the inner ring due to the crimping processing and calculating corrected post-crimping rotational torque between the post-crimping rotational torque measurement step and the second bearing preload value calculation step. In the second bearing preload value calculation step, a preload change amount between after the press-fitting step and after the crimping step is obtained based on a difference between the post-press-fitting rotational torque and the corrected post-crimping rotational torque, and a second bearing preload value is calculated by adding the preload change amount to the first bearing preload value.

In a fifth invention, according to the first invention, the preload inspection method further includes a temperature measurement step of measuring temperature of a crimped portion of the hub ring and the inner ring after completion of the crimping processing, and a rotational torque correction step of correcting the post-crimping rotational torque based on temperature of the crimped portion measured in the temperature measurement step to calculate corrected post-crimping rotational torque. In the second bearing preload value calculation step, a preload change amount between after the press-fitting step and after the crimping step is obtained based on a difference between the post-press-fitting rotational torque and the corrected post-crimping rotational torque, and a second bearing preload value is calculated by adding the preload change amount to the first bearing preload value.

According to a sixth invention, in the first invention, the preload inspection method further includes a crimping processing degree measurement step of measuring crimping processing degree of a crimped portion formed in the small-diameter step portion in the crimping step. The determining step includes a first determination step of determining appropriateness or inappropriateness of a preload applied to the bearing device for a vehicle wheel depending on whether or not the second bearing preload value falls within a range of a reference value, and a second determination step of collating the crimping processing degree with a value of the differential torque, and determining presence or absence of a crimping abnormality depending on whether or not a value of the differential torque with respect to the crimping processing degree falls within a range of a torque reference value.

A seventh invention is a preload inspection method for a bearing device for a vehicle wheel including an outer member having a plurality of rows of outer raceway surfaces on an inner periphery, an inner member including a hub ring that has a small-diameter step portion extending in an axial direction on an outer periphery and an inner ring that is press-fitted into the small-diameter step portion of the hub ring, the inner member having a plurality of rows of inner raceway surfaces facing a plurality of rows of the outer raceway surfaces, and a plurality of rows of rolling bodies rollably accommodated between both raceway surfaces of the outer member and the inner member, the preload inspection method including a press-fitting step of press-fitting the inner ring into the small-diameter step portion of the hub ring to a position where the inner ring abuts on the hub ring in the axial direction, a first inner ring height measurement step of measuring a first inner ring height from an outer-side end portion of the hub ring to an inner-side end portion of the inner ring after the press-fitting step, a first bearing preload value calculation step of measuring an axial negative gap between both the raceway surfaces and the rolling body after the press-fitting step and calculating a bearing preload value of the bearing device for a vehicle wheel based on the axial negative gap, a post-press-fitting rotational torque measurement step of measuring post-press-fitting rotational torque of the bearing device for a vehicle wheel when the inner member and the outer member are relatively rotated after the press-fitting step, a crimping step of crimping an inner-side end portion of the small-diameter step portion to the inner ring after the first inner ring height measurement step and the post-press-fitting rotational torque measurement step, a post-crimping temperature measurement step of measuring temperature of a crimped portion between the small-diameter step portion and the inner ring after the crimping step, a second inner ring height measurement step of measuring a second inner ring height from an outer-side end portion of the hub ring to an inner-side end portion of the inner ring after the crimping step, an inner ring pressing amount estimation step of calculating a pressing amount of the inner ring from a difference between the first inner ring height and the second inner ring height, correcting a pressing amount of the inner ring based on temperature of the crimped portion, and estimating a corrected pressing amount of the inner ring with respect to the hub ring, a final gap calculation step of calculating a gap decrease amount between both the raceway surfaces and the rolling body based on the estimated corrected pressing amount of the inner ring, and calculating a final gap between the inner ring and the hub ring based on the gap decrease amount and the axial negative gap, a second bearing preload value calculation step of calculating a second bearing preload value of the bearing device for a vehicle wheel based on the calculated final gap, a post-crimping rotational torque measurement step of measuring post-crimping rotational torque of the bearing device for a vehicle wheel when the inner member and the outer member are relatively rotated after the crimping step, a post-crimping rotational torque correction step of estimating a torque increase amount caused by a temperature change in the post-crimping rotational torque based on temperature of the crimped portion after the crimping step and correcting the post-crimping rotational torque by subtracting the torque increase amount from the post-crimping rotational torque, a preload change amount estimation step of calculating differential torque between the post-press-fitting rotational torque and the post-crimping rotational torque after correction and estimating a preload change amount caused by the crimping processing based on the differential torque, a third bearing preload value calculation step of calculating a third bearing preload value by adding the preload change amount to the first bearing preload value, and a determination step of determining appropriateness or inappropriateness of a preload applied to the bearing device for a vehicle wheel based on whether or not each of the second bearing preload value and the third bearing preload value is within a predetermined threshold and whether or not a relative difference between the second bearing preload value and the third bearing preload value is within a predetermined threshold.

Advantageous Effects of Invention

As advantageous effects of the present invention, effects described below are obtained.

According to the first invention, a preload applied to the bearing device for a vehicle wheel can be inspected with higher reliability.

According to the second invention, by taking into account a change in rotational torque due to ambient temperature, and according to the third invention, by taking into account a change in rotational torque due to surface temperature of the bearing device for a vehicle wheel, a preload applied to the bearing device for a vehicle wheel can be inspected with higher reliability.

According to the fourth invention, influence of a temperature increase of the inner ring due to the crimping processing can be suppressed, and quality of a preload applied to the bearing device for a vehicle wheel can be determined with higher accuracy.

According to the fifth invention, it is possible to determine quality of a preload applied to the bearing device for a vehicle wheel with higher accuracy in consideration of influence of a temperature increase of the inner ring due to the crimping processing.

According to the sixth invention, it is possible to further increase reliability when appropriateness or inappropriateness of a preload applied to the bearing device for a vehicle wheel is determined.

According to the seventh invention, a preload applied to the bearing device for a vehicle wheel can be inspected with higher reliability.

DESCRIPTION OF EMBODIMENTS

[Bearing Device for Vehicle Wheel]

Hereinafter, a bearing device for a vehicle wheel 1 as a first embodiment of a bearing device for a vehicle wheel for which a preload inspection method according to the present invention is performed will be described with reference to FIG. 1.

Figure 1:
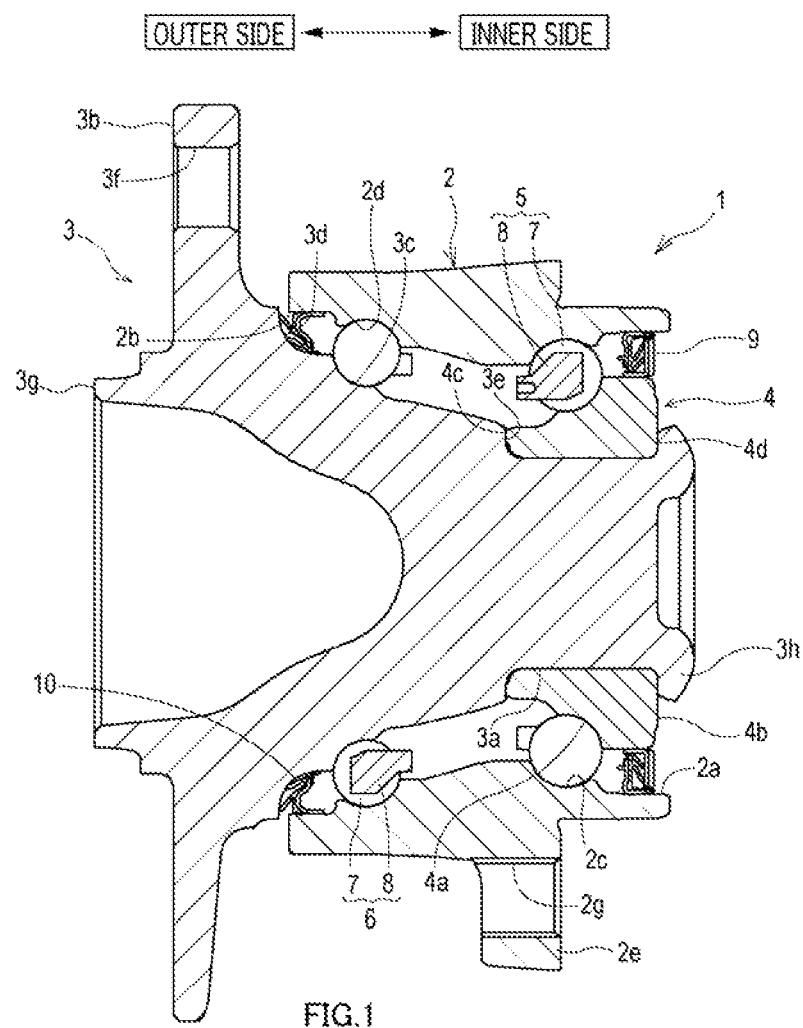
FIG. 1 is a side cross-sectional view illustrating a bearing device for a vehicle wheel in which a preload inspection method is performed.

The bearing device for a vehicle wheel 1 illustrated in FIG. 1 rotatably supports a wheel in a suspension device of a vehicle such as an automobile. The bearing device for a vehicle wheel 1 has a "third generation" configuration, and includes an outer ring 2 that is an outer member, a hub ring 3 and an inner ring 4 that are inner members, two rows of an inner-side ball row 5 and an outer-side ball row 6 that are rolling rows, and an inner-side seal member 9 and an outer-side seal member 10. Here, "inner side" represents the vehicle body side of the bearing device for a vehicle wheel 1 when attached to a vehicle body, and "outer side" represents the wheel side of the bearing device for a vehicle wheel 1 when attached to the vehicle body. Further, the axial direction represents a direction along a rotation axis of the bearing device for a vehicle wheel 1.

An inner-side opening portion 2a to which the inner-side seal member 9 can be fitted is formed in an inner-side end portion of the outer ring 2. An outer-side opening portion 2b to which the outer-side seal member 10 can be fitted is formed in an outer-side end portion of the outer ring 2. An outer raceway surface 2c on the inner side and an outer raceway surface 2d on the outer side are formed on the inner peripheral surface of the outer ring 2. A vehicle body mounting flange 2e for mounting the outer ring 2 on a vehicle body side member is integrally formed on the outer peripheral surface of the outer ring 2. The vehicle body mounting flange 2e is provided with a bolt hole 2g into which a fastening member (here, a bolt) for fastening the vehicle body side member and the outer ring 2 is inserted.

In an inner-side end portion of the hub ring 3, a small-diameter step portion 3a whose diameter is smaller than that of an outer-side end portion is formed on the outer peripheral surface. A shoulder portion 3e is formed in an outer-side end portion of the small-diameter step portion 3a of the hub ring 3. A vehicle wheel mounting flange 3b for mounting a wheel is integrally formed in an outer-side end portion of the hub ring 3. The vehicle wheel mounting flange 3b is provided with a bolt hole 3f into which a hub bolt for fastening the hub ring 3 and a wheel or a brake component is press-fitted.

The hub ring 3 is provided with an inner raceway surface 3c on the outer side in a manner facing the outer raceway surface 2d on the outer side of the outer ring 2. A lip sliding surface 3d with which the outer-side seal member 10 comes into sliding contact is formed on the base portion side of the vehicle wheel mounting flange 3b of the hub ring 3. The outer-side seal member 10 is fitted to an outer-side opening end of an annular space formed by the outer ring 2 and the hub ring 3. The hub ring 3 has an outer-side end surface 3g in an end portion further on the outer side than the vehicle wheel mounting flange 3b.

The inner ring 4 is provided on the small-diameter step portion 3a of the hub ring 3. The inner ring 4 is fixed to the small-diameter step portion 3a of the hub ring 3 by press-fitting and crimping. The inner ring 4 applies a preload to the inner-side ball row 5 and the outer-side ball row 6 which are rolling rows. The inner ring 4 has an inner-side end surface 4b in an inner-side end portion, and an outer-side end surface 4c in an outer-side end portion. A crimped portion 3h crimped to the inner-side end surface 4b of the inner ring 4 is formed in an inner-side end portion of the hub ring 3. Note that, in the inner ring 4, a portion where the crimped portion 3h of the hub ring 3 is in close contact is referred to as a crimped portion 4d on the inner ring 4 side. The crimped portion 4d is a part of the inner-side end surface 4b. That is, the crimped portion in the bearing device for a vehicle wheel 1 includes the crimped portion 3h on the hub ring 3 side and the crimped portion 4d on the inner ring 4 side.

An inner raceway surface 4a is formed on an outer peripheral surface of the inner ring 4. That is, the inner ring 4 forms the inner raceway surface 4a on the inner side of the hub ring 3. The inner raceway surface 4a of the inner ring 4 faces the outer raceway surface 2c on the inner side of the outer ring 2.

The inner-side ball row 5 and the outer-side ball row 6, which are rolling rows, are configured in a manner that a plurality of balls 7, which are rolling bodies, are held by a cage 8. The inner-side ball row 5 is rollably sandwiched between the inner raceway surface 4a of the inner ring 4 and the outer raceway surface 2c on the inner side of the outer ring 2. The outer-side ball row 6 is rollably sandwiched between the inner raceway surface 3c of the hub ring 3 and the outer raceway surface 2d on the outer side of the outer ring 2.

In the bearing device for a vehicle wheel 1, the outer ring 2, the hub ring 3 and the inner ring 4, the inner-side ball row 5, and the outer-side ball row 6 constitute a double row angular contact ball bearing. Note that the bearing device for a vehicle wheel 1 may be configured by a double row tapered roller bearing.

[Preload Inspection Method]

Next, a preload inspection method of the bearing device for a vehicle wheel 1 will be described by taking first to sixth embodiments as an example.

First Embodiment

Figure 2:
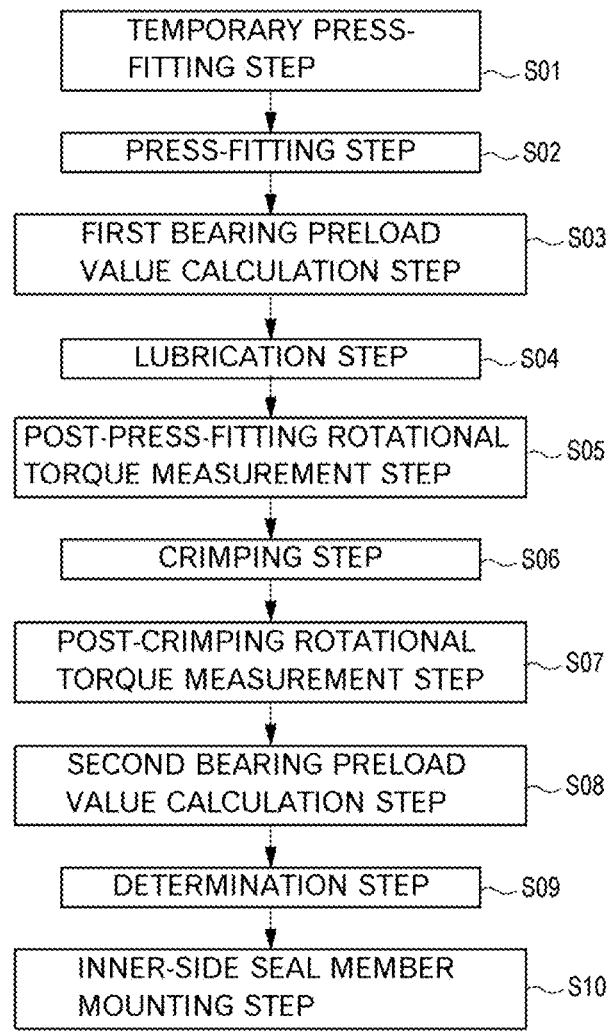
FIG. 2 is a diagram illustrating a process of the preload inspection method according to a first embodiment.

As illustrated in FIG. 2, the preload inspection method in the present embodiment is performed during assembly of the bearing device for a vehicle wheel 1. Specifically, the preload inspection method includes a temporary press-fitting step (S01), a press-fitting step (S02), a first bearing preload value calculation step (S03), a lubrication step (S04), a post-press-fitting rotational torque measurement step (S05), a crimping step (S06), a post-crimping rotational torque measurement step (S07), a second bearing preload value calculation step (S08), a determination step (S09), and an inner-side seal member mounting step (S10). Each step of the preload inspection method will be described below.

(Temporary Press-Fitting Step)

Figure 3:
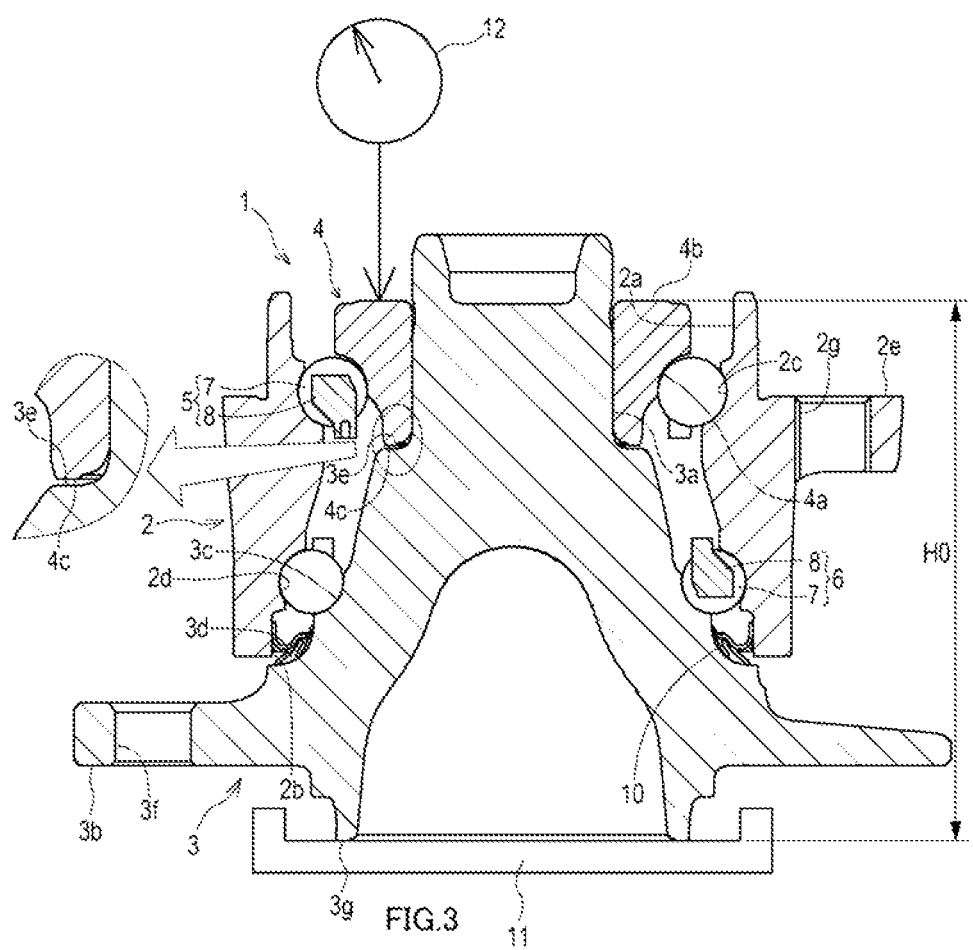
FIG. 3 is a side cross-sectional view illustrating the bearing device for a vehicle wheel in a state where an inner ring is temporarily press-fitted into a small-diameter step portion of a hub ring.

As illustrated in FIG. 3, the hub ring 3 is placed on a support base 11 in a posture in which the axial direction is the vertical direction and the outer-side end surface 3g is positioned downward. The outer-side end surface 3g of the hub ring 3 is grounded to the support base 11. The outer ring 2 is rotatably mounted on the hub ring 3 placed on the support base 11 via the inner-side ball row 5 and the outer-side ball row 6. The outer-side seal member 10 is fitted to an outer-side end portion of the outer ring 2. A space between the hub ring 3 and the outer ring 2 is filled with grease.

In the temporary press-fitting step (S01), first, the inner ring 4 is temporarily press-fitted into the small-diameter step portion 3a of the hub ring 3 placed on the support base 11. The temporary press-fitting of the inner ring 4 is performed by press-fitting the inner ring 4 into the small-diameter step portion 3a from above and stopping the press-fitting before the outer-side end surface 4c of the inner ring 4 abuts on the shoulder portion 3e of the hub ring 3. Here, the press-fitting work of the inner ring 4 is performed in a state where a predetermined pressure is applied using a pushing device such as a hydraulic cylinder or an air cylinder, for example. At a time point that the temporary press-fitting of the inner ring 4 is completed, an axial positive gap G0 exists between a raceway surface (for example, the outer raceway surface 2c and the inner raceway surface 4a) and a rolling body. The axial positive gap G0 can be measured, for example, from an axial movement amount of the outer ring 2.

In the temporary press-fitting step (S01), the axial positive gap G0 between a raceway surface (for example, the outer raceway surface 2c and the inner raceway surface 4a) and a rolling body and an axial dimension H0 between the outer-side end surface 3g of the hub ring 3 and the inner-side end surface 4b of the inner ring 4 after the temporary press-fitting of the inner ring 4 are measured. The axial dimension H0 can be measured by a measuring instrument 12 such as a dial gauge.

(Press-Fitting Step)

Figure 4:
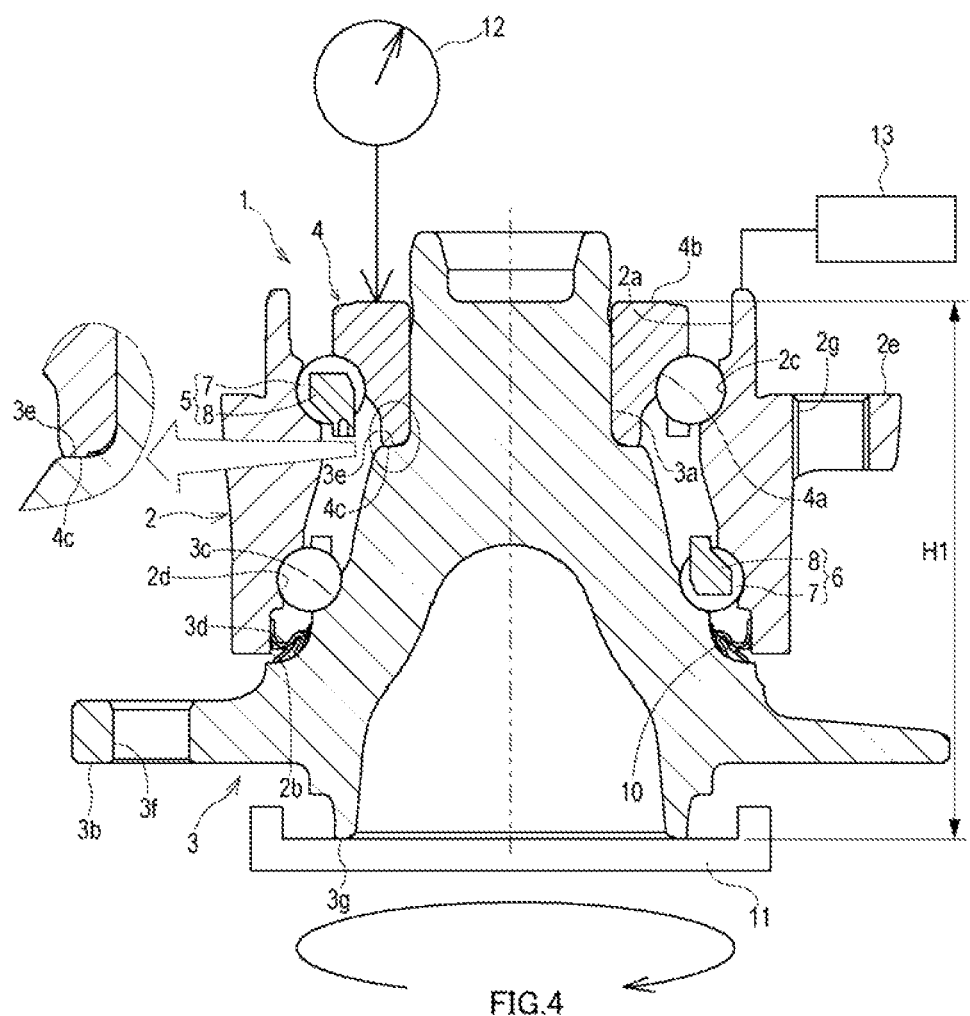
FIG. 4 is a side cross-sectional view illustrating the bearing device for a vehicle wheel in a state where the inner ring is press-fitted into the small-diameter step portion of the hub ring.

After the temporary press-fitting step (S01), the press-fitting step (S02) is performed. As illustrated in FIG. 4, in the press-fitting step (S02), the inner ring 4 is press-fitted into the small-diameter step portion 3a to a position where the outer-side end surface 4c of the inner ring 4 abuts on the shoulder portion 3e of the hub ring 3. After the press-fitting of the inner ring 4 into the small-diameter step portion 3a is completed, an axial dimension H1 between the outer-side end surface 3g of the hub ring 3 and the inner-side end surface 4b of the inner ring 4 after the press-fitting of the inner ring 4 is measured. Further, a value obtained by subtracting the axial dimension H1 from the axial dimension H0 is subtracted from the axial positive gap G0 between a raceway surface and a rolling body measured in the temporary press-fitting step (S01) to obtain an axial negative gap G1 between a raceway surface and a rolling body after the press-fitting of the inner ring 4 (G1=G0−(H0−H1)).

(First Bearing Preload Value Calculation Step)

The first bearing preload value calculation step (S03) is performed after the press-fitting step (S02). In the first bearing preload value calculation step (S03), a first bearing preload value P1 applied to the bearing after the press-fitting step is calculated based on the axial negative gap G1. The first bearing preload value P1 is calculated by applying the axial negative gap G1 to a relationship between an axial negative gap and a bearing preload value in the bearing device for a vehicle wheel 1 which has been obtained, in advance, by an experiment or the like. Note that the relationship between an axial negative gap and a bearing preload value can be obtained for each specification of the bearing device for a vehicle wheel 1.

(Lubrication Step)

The lubrication step (S04) is performed after the first bearing preload value calculation step (S03). In the lubrication step (S04), the hub ring 3 into which the inner ring 4 is press-fitted and the outer ring 2 are relatively rotated, so that the balls 7 of the inner-side ball row 5 and the outer-side ball row 6 are lubricated with the grease with which a space between the hub ring 3 and the outer ring 2 is filled. In the lubrication step (S04), the hub ring 2 may be rotated while the outer ring 2 is fixed, or the outer ring 2 may be rotated while the hub ring 3 is fixed.

By performing the lubrication step (S04), the resistance generated between the grease and the ball 7 can be made constant when the hub ring 3 and the outer ring 2 are relatively rotated. In this manner, when the rotational torque of the bearing device for a vehicle wheel 1 is measured in the post-press-fitting rotational torque measurement step (S05) and the post-crimping rotational torque measurement step (S08) that are performed later, it is possible to suppress variations in the measured rotational torque. Note that, in the lubrication step (S04), it is preferable to relatively rotate the hub ring 3 and the outer ring 2 by 30 rotations or more from the viewpoint of suppressing variations in rotational torque.

(Post-Press-Fitting Rotational Torque Measurement Step)

The post-press-fitting rotational torque measurement step (S05) is performed after the lubrication step (S04). In the post-press-fitting rotational torque measurement step (S05), a torque measuring instrument 13 measures post-press-fitting rotational torque Ta when the hub ring 3 with the inner ring 4 press-fitted into the small-diameter step portion 3a and the outer ring 2 are relatively rotated. The post-press-fitting rotational torque Ta is rotational torque measured after the press-fitting step (S02) and before the crimping step (S06). In the post-press-fitting rotational torque measurement step (S05), the hub ring 3 may be rotated while the outer ring 2 is fixed, or the outer ring 2 may be rotated while the hub ring 3 is fixed.

In a case where the hub ring 3 is rotated, the revolution speed of the balls 7 in the inner-side ball row 5 and the outer-side ball row 6 becomes lower than that in a case where the outer ring 2 is rotated, and the variation in the rotational torque value measured when the rotational speed of the hub ring 3 changes becomes small. Therefore, it is preferable to rotate the hub ring 3 in the rotational torque measurement step. Note that, in a case where the hub ring 3 is rotated, the hub ring 3 can be rotated by rotating the support base 11 on which the hub ring 3 is placed.

Figure 5:
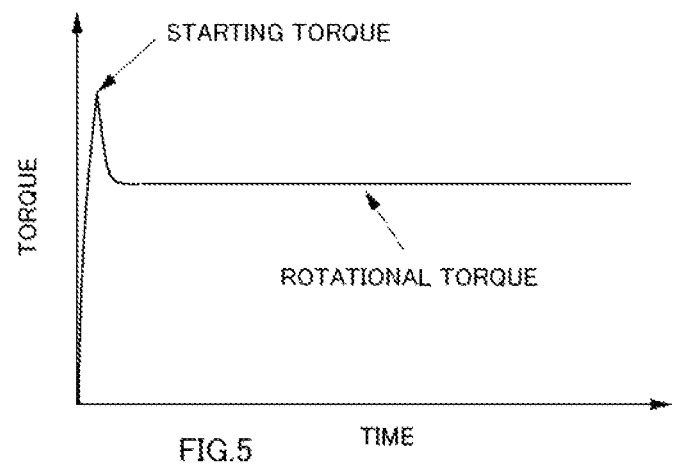
FIG. 5 is a diagram illustrating a relationship between time and torque when the hub ring and an outer ring are relatively rotated.

Further, in the post-press-fitting rotational torque measurement step (S05), not starting torque of the bearing but rotational torque is measured. As illustrated in FIG. 5, starting torque, which is a peak value of initial motion torque when rotation of the bearing is started, decreases with the lapse of time, and has a large temporal change. Therefore, repetitive reproducibility is poor. In contrast, rotational torque is torque after the bearing starts rotating, and shows a constant value with a small temporal change. Therefore, in the post-press-fitting rotational torque measurement step (S05), a torque value of the bearing can be measured with high accuracy by measuring the post-press-fitting rotational torque Ta which is rotational torque.

Figure 6:
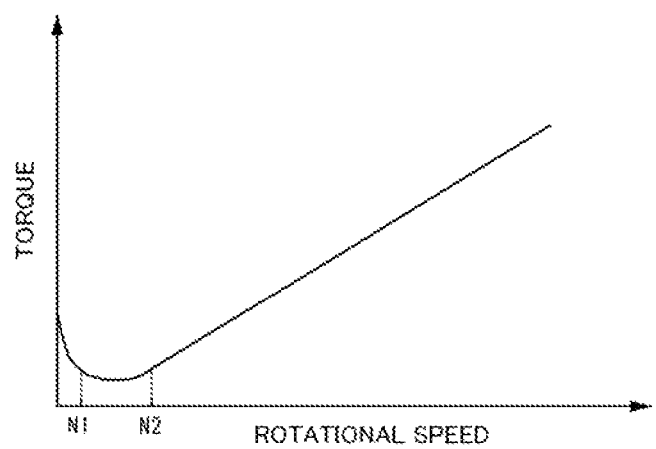
FIG. 6 is a diagram illustrating a relationship between a rotational speed and torque when the hub ring and the outer ring are relatively rotated.

As illustrated in FIG. 6, rotational torque of the bearing when the hub ring 3 and the outer ring 2 are relatively rotated, which increases as a rotational speed increases in a range where a rotational speed of the hub ring 3 or the outer ring 2 is equal to or more than a certain value, decreases as the rotational speed increases when the rotational speed of the hub ring 3 or the outer ring 2 is extremely low, and then turns to increase. That is, there is a region where the rotational torque of the bearing changes from decreasing to increasing as the rotational speed increases, and in the region, degree of fluctuation of the rotational torque with respect to a change in the rotational speed is small.

In the post-press-fitting rotational torque measurement step (S05), the hub ring 3 or the outer ring 2 is rotated at a constant rotational speed so that measured rotational torque does not vary. Further, the rotational speed of the hub ring 3 or the outer ring 2 is set in a range of rotational speeds N1 to N2 in a region where the rotational torque changes from decreasing to increasing. In this manner, even if the rotational speed changes during the measurement of the post-press-fitting rotational torque Ta, the fluctuation of the rotational torque can be reduced.

In the post-press-fitting rotational torque measurement step (S05), the rotational torque is measured in a state where a dynamic frictional force is generated between the inner members 3 and 4 and the outer member 2. Specifically, the rotational torque is measured in a state where a dynamic frictional force is generated between the inner members 3 and 4 and the rolling body 7, between the hub ring 3 and the outer-side seal member 10, and between the outer ring 2 and the rolling bodies 7 and the outer-side seal member 10. In general, since a coefficient of dynamic friction is smaller than a coefficient of static friction and has a small variation, the rotational torque can be measured with high accuracy.

The rotational speed N1, which is a lower limit value of the range of the rotational speed, is preferably set to 10 rotations/min at which the rotational torque can be measured in a state where a dynamic frictional force is generated. The rotational speed N2, which is an upper limit value of the range of the rotational speed, is preferably set to 60 rotations/min, which is the rotational speed at which stirring resistance of the grease with which a space between the hub ring 3 and the outer ring 2 is filled is as small as possible. This makes it possible to measure the rotational torque with high accuracy.

Further, the rotation speed of the hub ring 3 or the outer ring 2 is more preferably set to a rotation speed of 10 rotations/min to 30 rotations/min at which a fluctuation of the rotational torque with respect to a change in the rotation speed becomes smallest within the range of 10 rotations/min to 60 rotations/min. This makes it possible to measure the rotational torque with higher accuracy.

As described above, in the post-press-fitting rotational torque measurement step (S05), the hub ring 3 or the outer ring 2 is rotated in the range of the small rotational speeds N1 to N2 at which the degree of variation in the rotational torque with respect to a change in the rotational speed is small. Thus, even in a case where the rotational speed of the hub ring 3 or the outer ring 2 changes, the variation in the rotational torque can be minimized and the rotational torque can be measured with high accuracy.

Further, in the post-press-fitting rotational torque measurement step (S05), the rotational torque of the bearing device for a vehicle wheel 1 is measured in a state where the outer-side seal member 10 is fitted to an outer-side opening end of an annular space formed by the outer ring 2 and the hub ring 3. Here, the outer-side seal member 10 is located axially on the opposite side to the small-diameter step portion 3a of the hub ring 3 that is crimped for fixing the inner ring 4. Therefore, even if an abnormality occurs in the inner ring raceway surface 4a or the like in the crimping step (S06) described below, seal torque of the outer-side seal member 10 is hardly affected and the rotational torque of the bearing device for a vehicle wheel 1 is also hardly changed.

(Crimping Step)

Figure 7:
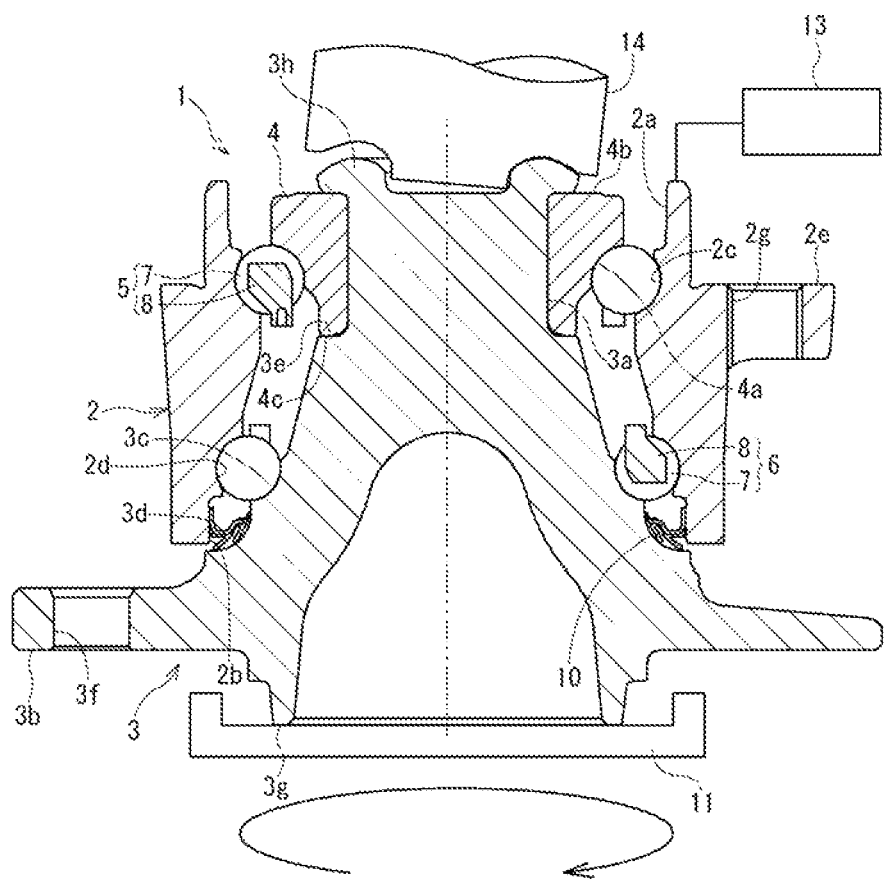
FIG. 7 is a side cross-sectional view illustrating the bearing device for a vehicle wheel in a state where the small-diameter step portion of the hub ring is crimped to the inner ring.

The crimping step (S06) is performed after the post-press-fitting rotational torque measurement step (S05). In the crimping step (S06), crimping processing for crimping an inner-side end portion of the small-diameter step portion 3a of the hub ring 3 to the inner-side end surface 4b of the inner ring 4 is performed. As illustrated in FIG. 7, the crimping processing can be performed by swinging crimping processing using a crimping tool such as a crimping punch 14. The crimping processing by the swinging crimping processing is performed by, for example, lowering the crimping punch 14 arranged above the small-diameter step portion 3a of the hub ring 3 to abut on the inner-side end portion of the small-diameter step portion 3a, and swinging the crimping punch 14 in a state of abutting on the small-diameter step portion 3a. When the crimping processing is completed, the crimping punch 14 is raised and separated from the small-diameter step portion 3a. After the crimping processing is performed, an axial negative gap is generated between the inner ring 4 and the hub ring 3.

(Post-Crimping Rotational Torque Measurement Step)

The post-crimping rotational torque measurement step (S07) is performed after the crimping step (S06). In the post-crimping rotational torque measurement step (S07), rotational torque is measured in a state where a dynamic frictional force is generated between the inner members 3 and 4 and the outer member 2, as in the post-press-fitting rotational torque measurement step. In the post-crimping rotational torque measurement step (S07), the torque measuring instrument 13 measures a post-crimping rotational torque Tb when the hub ring 3 in which the small-diameter step portion 3a is crimped to the inner ring 4 and the outer ring 2 are relatively rotated. The post-crimping rotational torque Tb is rotational torque measured after the crimping step (S06) and before the inner-side seal member mounting step (S10). In the post-crimping rotational torque measurement step (S07), the hub ring 3 may be rotated while the outer ring 2 is fixed, or the outer ring 2 may be rotated while the hub ring 3 is fixed.

However, as in the case of the post-press-fitting rotational torque measurement step (S05), it is preferable to rotate the hub ring 3 because the variation in the rotational torque value measured when the rotational speed of the hub ring 3 changes is reduced. Further, also in the post-crimping rotational torque measurement step (S07), the rotational torque can be measured with high accuracy as in the case of the post-press-fitting rotational torque measurement step (S05), by measuring the rotational torque instead of the starting torque of the bearing, and measuring the post-crimping rotational torque Tb while the hub ring 3 or the outer ring 2 is rotated at a constant rotational speed at the low rotational speed N1 to N2.

In this case, as in the case of the post-press-fitting rotational torque measurement step (S05), the rotational speed N1 is preferably set to 10 rotations/min and the rotational speed N2 is preferably set to 60 rotations/min. In the present embodiment, the rotation speed of the hub ring 3 or the outer ring 2 is set to a rotation speed of 10 rotations/min to 30 rotations/min at which a fluctuation of the rotational torque with respect to a change in the rotation speed becomes smallest within the range of 10 rotations/min to 60 rotations/min. In this manner, even if the rotational speed changes during measurement of the post-crimping rotational torque Tb, a fluctuation of the post-crimping rotational torque Tb can be reduced, and the rotational torque can be stably measured.

Further, between the crimping step (S06) and the post-crimping rotational torque measurement step (S07), a step similar to the lubrication step (S04), that is, a lubrication step of causing the grease with which a space between the hub ring 3 and the outer ring 2 is filled to lubricate the ball 7 in the inner-side ball row 5 and the outer-side ball row 6 can be performed. In this manner, resistance generated between the grease and the balls 7 when the hub ring 3 and the outer ring 2 are relatively rotated can be made constant, and when the post-crimping rotational torque Tb of the bearing device for a vehicle wheel 1 is measured in the post-crimping rotational torque measurement step (S07), it is possible to further suppress occurrence of variations in the measured post-crimping rotational torque Tb.

However, in a case where the grease sufficiently lubricates the ball 7 by performing the lubrication step (S04) and resistance generated between the grease and the ball 7 is constant, the lubrication step between the crimping step (S06) and the post-crimping rotational torque measurement step (S07) can be omitted.

(Second Bearing Preload Value Calculation Step)

The second bearing preload value calculation step (S08) is performed after the post-crimping rotational torque measurement step (S07). In the second bearing preload value calculation step (S08), differential torque $\Delta T$ (Tb−Ta=$\Delta T$) between the post-press-fitting rotational torque Ta and the post-crimping rotational torque Tb is calculated. Further, a preload change amount $\Delta P$ between after the press-fitting step and after the crimping processing is obtained based on the differential torque $\Delta T$. Furthermore, a second bearing preload value P2 is calculated by adding the preload change amount $\Delta P$ to the first bearing preload value P1 calculated in the first bearing preload value calculation step (S03).

Figure 8:
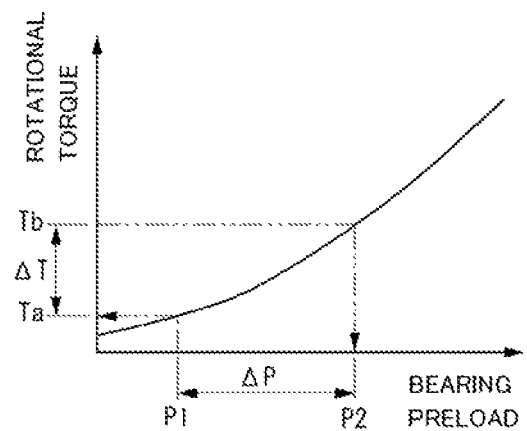
FIG. 8 is a diagram illustrating a relationship between a bearing preload and rotational torque.

In this case, the differential torque $\Delta T$ is rotational torque increased by the crimping processing performed in the crimping step (S06). Further, the preload change amount $\Delta P$ is a preload increased by the crimping processing performed in the crimping step (S06). As illustrated in FIG. 8, the preload change amount $\Delta P$ is calculated by applying the differential torque $\Delta T$ to a relationship between a bearing preload of the bearing device for a vehicle wheel 1 and rotational torque of the bearing which is obtained, in advance, by an experiment or the like. Note that the relationship between a bearing preload and rotational torque of the bearing can be obtained for each specification of the bearing device for a vehicle wheel 1.

(Determination Step)

After the second bearing preload value calculation step (S08), the determination step (S09) is performed. In the determination step (S09), appropriateness or inappropriateness of a preload applied to the bearing device for a vehicle wheel 1 is determined depending on whether or not the second bearing preload value P2 falls within a range of a predetermined reference value. In the determination step (S09), if the second bearing preload value P2 falls within a range of a predetermined reference value, a preload applied to the bearing device for a vehicle wheel 1 is determined to be appropriate, and if the second bearing preload value P2 does not fall within the range of the predetermined reference value, a preload applied to the bearing device for a vehicle wheel 1 is determined not to be appropriate.

In the second bearing preload value calculation step (S08), the second bearing preload value P2 is calculated after obtaining the preload change amount $\Delta P$ due to the crimping processing using the post-press-fitting rotational torque Ta and the post-crimping rotational torque Tb, which are rotational torque before and after the crimping processing.

As described above, in a case where a preload is calculated using rotational torque before and after the crimping processing, for example, when an abnormality such as shape collapse of an inner ring raceway surface occurs during the crimping processing, an increase amount of rotational torque before and after the crimping processing becomes large, and thus the calculated second bearing preload value P2 deviates from the range of the predetermined reference value. Therefore, by determining the calculated second bearing preload value P2 in the determination step (S09), it is possible to detect occurrence of an abnormality in the bearing device for a vehicle wheel 1 after the crimping processing, and it is possible to improve reliability of a measured value of a preload applied to the bearing device for a vehicle wheel 1. This makes it possible to inspect a preload applied to the bearing device for a vehicle wheel 1 with higher reliability.

Further, the post-press-fitting rotational torque Ta and the post-crimping rotational torque Tb before and after the crimping processing used when the second bearing preload value P2 is calculated are values measured for the same bearing device for a vehicle wheel 1. Therefore, the differential torque $\Delta T$ between the post-press-fitting rotational torque Ta and the post-crimping rotational torque Tb does not include variations in the individual bearing devices for a vehicle wheel 1 such as a lip interference of the outer-side seal member 10 and an amount of grease with which a space between the hub ring 3 and the outer ring 2 is filled, and only an increase amount of rotational torque due to the crimping processing is extracted. In this manner, the second bearing preload value P2 can be accurately calculated from the differential torque $\Delta T$, and appropriateness or inappropriateness of a preload applied to the bearing device for a vehicle wheel 1 can be determined with high accuracy in the determination step (S09).

Further, a reference value used when appropriateness or inappropriateness of a preload is determined in the determination step (S09) is set in consideration of variations in rotational torque generated by performing the crimping processing of crimping the small-diameter step portion 3a to the inner ring 4.

That is, variations due to movement of a position of grease between the hub ring 3 and the outer ring 2 before and after the crimping processing and a change in degree of contact of the outer-side seal member 10 with the hub ring 3 and the outer ring 2 may be included between the post-press-fitting rotational torque Ta and the post-crimping rotational torque Tb. Further, repeated variations in the rotational torque measurement may be included between the post-press-fitting rotational torque Ta measured before the crimping processing and the post-crimping rotational torque Tb measured after the crimping processing.

Therefore, in the present embodiment, in consideration of these variations, a range of a reference value is set to a narrower range as compared with a case where the variations are not considered. In this manner, appropriateness determination for a preload applied to the bearing device for a vehicle wheel 1 can be performed with high accuracy in the determination step (S09), and occurrence of erroneous determination can be suppressed.

(Inner-Side Seal Member Mounting Step)

Figure 9:
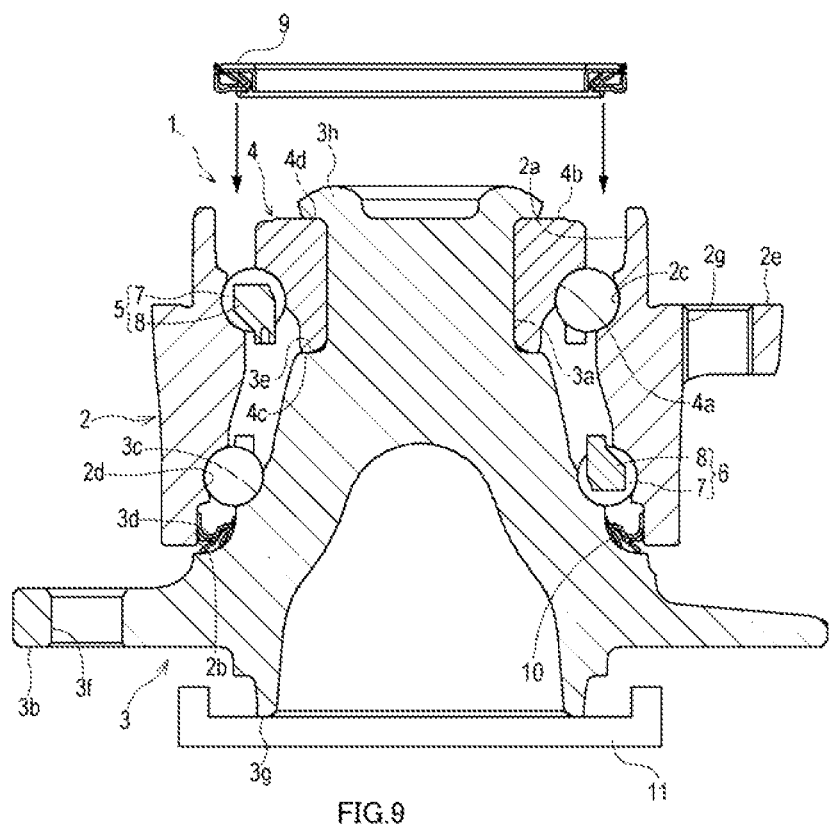
FIG. 9 is a side cross-sectional view illustrating a state in which an inner-side seal member is attached to an inner-side end portion of the outer ring after a post-crimping rotational torque measurement step.

After the determination step (S09), the inner-side seal member mounting step (S10) is performed. An assembling step of the bearing device for a vehicle wheel 1 is completed as the inner-side seal member mounting step (S10) is performed. Note that the inner-side seal member mounting step (S10) can be performed before the determination step (S09) or before the second bearing preload value calculation step (S08) as long as the inner-side seal member mounting step (S10) is performed after the post-crimping rotational torque measurement step (S07). As illustrated in FIG. 9, in the inner-side seal member mounting step (S10), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the crimping step (S06), sliding resistance between the outer ring 2 and the inner ring 4 of the inner-side seal member 9 changes depending on degree of crimping of the hub ring 3 in the crimping step (S06). Further, when the inner-side seal member 9 is mounted before the post-crimping rotational torque measurement step (S07) even after the crimping step (S06), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S06) or the post-crimping rotational torque measurement step (S07), there may be influence on variations in the post-crimping rotational torque Tb measured in the post-crimping rotational torque measurement step (S07). Similarly, in a case where the inner-side seal member 9 is mounted before the post-press-fitting rotational torque measurement step (S05), there may be influence on variations in the post-press-fitting rotational torque Ta measured in the post-press-fitting rotational torque measurement step (S05) depending on a mounting state of the inner-side seal member 9.

However, in the present embodiment, the inner-side seal member mounting step (S10) is performed after the post-crimping rotational torque measurement step (S07). Therefore, when the post-press-fitting rotational torque Ta and the post-crimping rotational torque Tb of the bearing device for a vehicle wheel 1 are measured in the post-press-fitting rotational torque measurement step (S05) and the post-crimping rotational torque measurement step (S07), variations in the rotational torque due to the influence of the inner-side seal member 9 are not generated, and the rotational torque of the bearing device for a vehicle wheel 1 can be measured with high accuracy.

In the present embodiment, the inner-side seal member mounting step (S10) is performed after the post-crimping rotational torque measurement step (S07), but a cap member mounting step may be performed after the post-crimping rotational torque measurement step (S07). In this case, in the cap member mounting step, a cap member is fitted to the inner-side opening portion 2a of the outer ring 2 instead of the inner-side seal member 9, and the inner-side opening portion 2a is closed by the cap member.

Second Embodiment

As illustrated in FIG. 2, the preload inspection method according to the present invention includes the temporary press-fitting step (S01), the press-fitting step (S02), the first bearing preload value calculation step (S03), the lubrication step (S04), the post-press-fitting rotational torque measurement step (S05), the crimping step (S06), the post-crimping rotational torque measurement step (S07), the second bearing preload value calculation step (S08), the determination step (S09), and the inner-side seal member mounting step (S10). Each step of the preload inspection method will be described below.

(Temporary Press-Fitting Step)

Since this step is similar to that of the first embodiment, description of this step will be omitted.

(Press-Fitting Step)

Since this step is similar to that of the first embodiment, description of this step will be omitted.

(First Bearing Preload Value Calculation Step)

Since this step is similar to that of the first embodiment, description of this step will be omitted.

(Lubrication Step)

Since this step is similar to that of the first embodiment, description of this step will be omitted.

(Post-Press-Fitting Rotational Torque Measurement Step)

A step similar to that in the first embodiment is performed.

Figure 10:
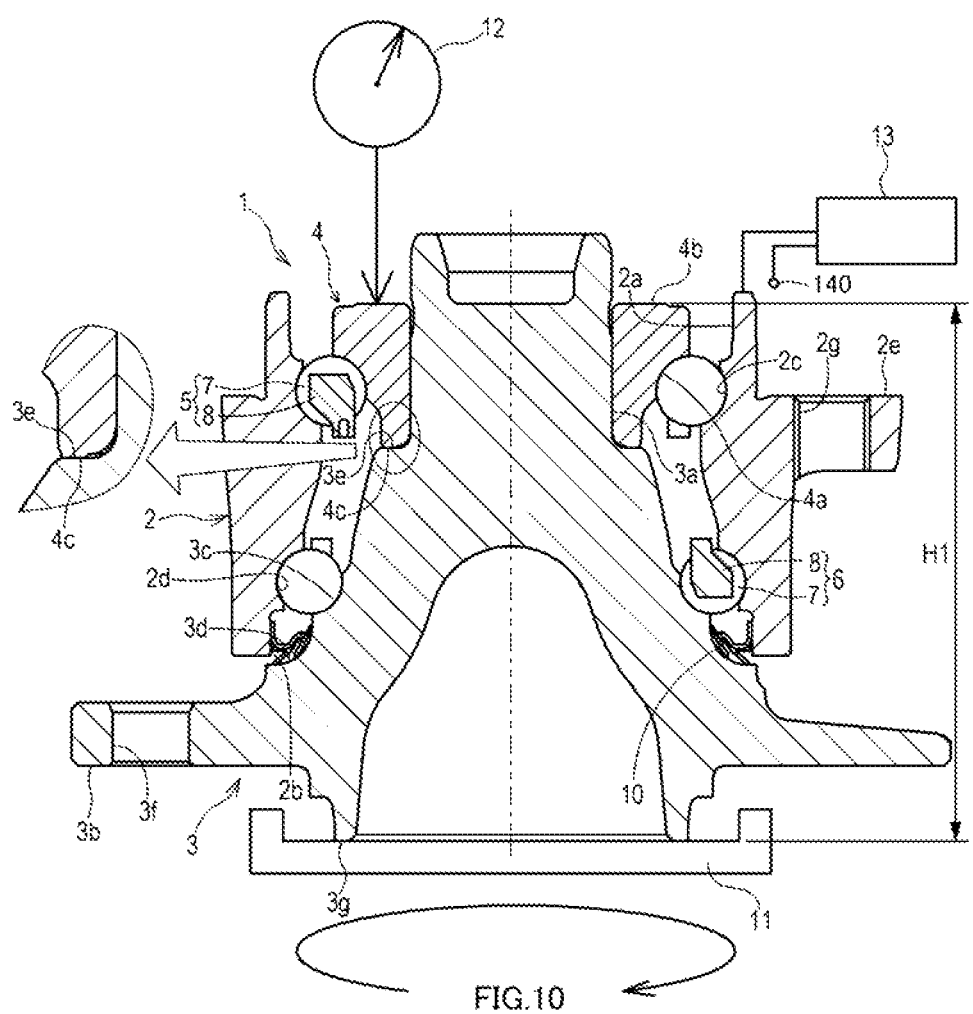
FIG. 10 is a side cross-sectional view illustrating the bearing device for a vehicle wheel in a state where the inner ring is press-fitted into the small-diameter step portion of the hub ring.

Further, in the post-press-fitting rotational torque measurement step (S05), ambient temperature A around the bearing device for a vehicle wheel 1 is also measured. For example, as illustrated in FIG. 10, a temperature sensor 140 may be provided in the torque measuring instrument 13 to measure ambient temperature in the vicinity of the outer ring 2. Note that, in the preload inspection method of the present embodiment, since there is no step of rotating the bearing device for a vehicle wheel 1 at a high speed as that in use, the ambient temperature A is substantially constant in all steps of the preload inspection method. Therefore, the ambient temperature A may be measured in any of the temporary press-fitting step (S01) to the second bearing preload value calculation step (S08).

(Crimping Step)

Since this step is similar to that of the first embodiment, description of this step will be omitted.

(Post-Crimping Rotational Torque Measurement Step)

Since this step is similar to that of the first embodiment, description of this step will be omitted.

(Second Bearing Preload Value Calculation Step)

The second bearing preload value calculation step (S08) is performed after the post-crimping rotational torque measurement step (S07). In the second bearing preload value calculation step (S08), differential torque $\Delta T$ (Tb−Ta=$\Delta T$) between the post-press-fitting rotational torque Ta and the post-crimping rotational torque Tb is calculated. Further, a preload change amount $\Delta P$ between after the press-fitting step and after the crimping processing is obtained based on the differential torque $\Delta T$. Furthermore, a second bearing preload value P2 is calculated by adding the preload change amount $\Delta P$ to the first bearing preload value P1 calculated in the first bearing preload value calculation step (S03).

Figure 11:
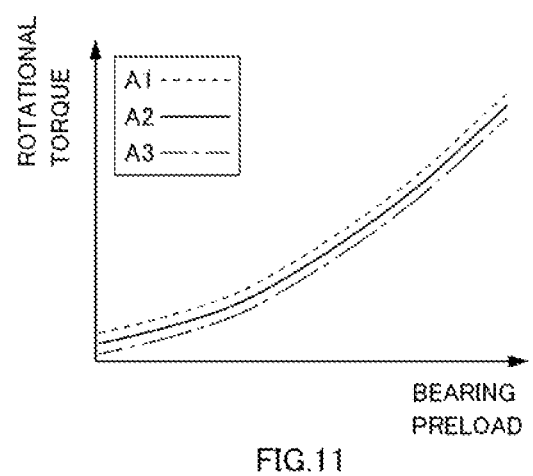
FIG. 11 is a diagram illustrating a relationship between a bearing preload and rotational torque according to ambient temperature.

In this case, the differential torque $\Delta T$ is rotational torque increased by the crimping processing performed in the crimping step (S06). Further, the preload change amount $\Delta P$ is a preload increased by the crimping processing performed in the crimping step (S06). In order to obtain the preload change amount $\Delta P$, as illustrated in FIG. 11, a relationship between a bearing preload of the bearing device for a vehicle wheel 1 and rotational torque of the bearing is obtained in advance by an experiment or the like according to a plurality of ambient temperatures. In FIG. 11, a broken line indicates a case of ambient temperature A1, a solid line indicates a case of ambient temperature A2 (A2>A1), and an alternate long and short dash line indicates a case of ambient temperature A3 (A3>A2). Then, the preload change amount ΔP is calculated by selecting a relationship corresponding to the ambient temperature A measured in the post-press-fitting rotational torque measurement step (S05) (in the present embodiment, the ambient temperature A2 is selected) and applying the differential torque ΔT to this relationship as illustrated in FIG. 8.

Note that the relationship between a bearing preload and rotational torque of the bearing can be obtained for each specification of the bearing device for a vehicle wheel 1. Further, although three of the ambient temperatures A1 to A3 are illustrated in FIG. 11, the present invention is not limited to this, and a relationship between a bearing preload and rotational torque of the bearing at two or more ambient temperatures only needs to be used, and accuracy is improved as the number of ambient temperatures increases.

Measured values of the post-press-fitting rotational torque Ta and the post-crimping rotational torque Tb vary depending on the ambient temperature A at the time of measurement even in the bearing device for a vehicle wheel 1 having the same axial positive gap G0 or axial negative gap G1. This is because film thickness of grease on a surface of the ball 7 in the inner-side ball row 5 and the outer-side ball row 6 changes as viscosity of the grease with which a space between the hub ring 3 and the outer ring 2 is filled changes, and a contact area of the ball 7 changes. In view of the above, the preload change amount ΔP can be obtained with high reliability by obtaining the preload change amount ΔP from the differential torque ΔT using a relationship between a bearing preload and rotational torque of the bearing according to the ambient temperature A as described above. Further, since the second bearing preload value P2 is calculated from the preload change amount ΔP with high reliability in consideration of the ambient temperature A, reliability of a measured value of a preload applied to the bearing device for a vehicle wheel 1 can be increased.

(Determination Step)

Since this step is similar to that of the first embodiment, description of this step will be omitted.

(Inner-Side Seal Member Mounting Step)

Since this step is similar to that of the first embodiment, description of this step will be omitted.

In the present embodiment, the ambient temperature A around the bearing device for a vehicle wheel 1 is measured in the post-press-fitting rotational torque measurement step (S05), and the preload change amount ΔP is calculated by selecting a relationship between a bearing preload and rotational torque of the bearing according to the ambient temperature A and applying the differential torque ΔT to this relationship in the second bearing preload value calculation step (S08). However, a surface temperature B of the bearing device for a vehicle wheel 1 may be used instead of the ambient temperature A. That is, the surface temperature B of the bearing device for a vehicle wheel 1 may be measured in the post-press-fitting rotational torque measurement step (S05), and in the second bearing preload value calculation step (S08), the preload change amount ΔP may be calculated by selecting a relationship between a bearing preload and rotational torque of the bearing according to the surface temperature B and applying the differential torque ΔT to this relationship. It is considered that the surface temperature B and the ambient temperature A of the bearing device for a vehicle wheel 1 usually indicate substantially the same temperature. A place where the surface temperature B is measured can be, for example, a surface of the outer ring 2.

As a means for measuring the surface temperature B, a contact type temperature sensor or a non-contact type temperature sensor can be used.

Third Embodiment

Figure 12:
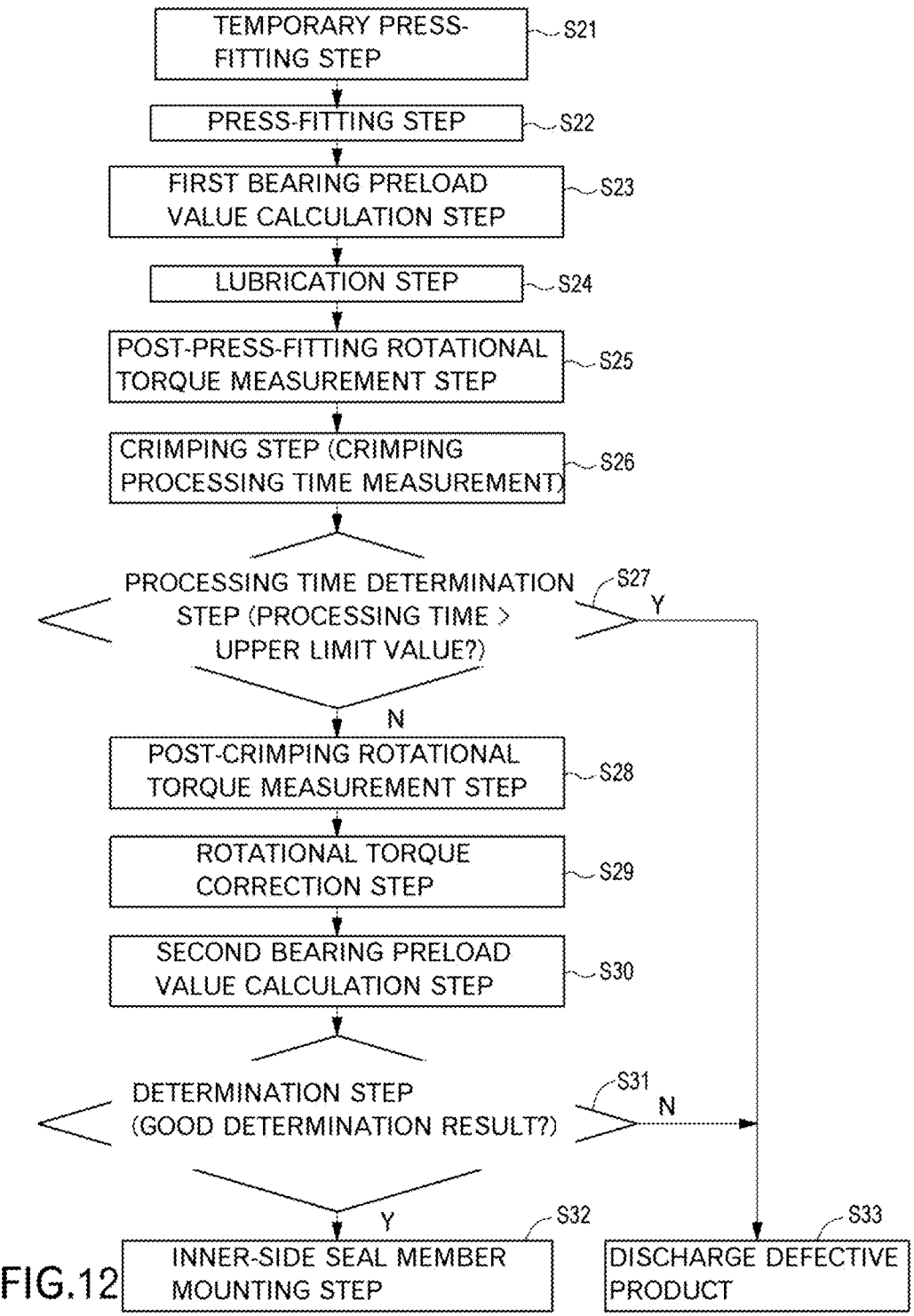
FIG. 12 is a diagram illustrating a process of the preload inspection method according to a third embodiment.

As illustrated in FIG. 12, the preload inspection method according to the present embodiment includes a temporary press-fitting step (S21), a press-fitting step (S22), a first bearing preload value calculation step (S23), a lubrication step (S24), a post-press-fitting rotational torque measurement step (S25), a crimping step (S26), a processing time determination step (S27), a post-crimping rotational torque measurement step (S28), a rotational torque correction step (S29), a second bearing preload value calculation step (S30), a determination step (S31), and an inner-side seal member mounting step (S32). Each step of the preload inspection method will be described below.

(Temporary Press-Fitting Step)

Since this step is similar to that of the first embodiment, description of this step will be omitted.

(Press-Fitting Step)

Since this step is similar to that of the first embodiment, description of this step will be omitted.

(First Bearing Preload Value Calculation Step)

Since this step is similar to that of the first embodiment, description of this step will be omitted.

(Lubrication Step)

Since this step is similar to that of the first embodiment, description of this step will be omitted.

(Post-Press-Fitting Rotational Torque Measurement Step)

Since this step is similar to that of the first embodiment, description of this step will be omitted.

(Crimping Step)

A step similar to that in the first embodiment is performed. Further, in the crimping step (S26), crimping processing time t, which is time required for the crimping processing, is measured. In the case of the present embodiment, the crimping processing time t to be measured is time from a time point when lowering of the crimping punch 14 is started in order to perform the crimping processing to a time point when the crimping processing is completed and raising of the crimping punch 14 is started.

(Processing Time Determination Step)

After the crimping step (S26), the processing time determination step (S27) is performed. In the processing time determination step (S27), whether or not the measured crimping processing time t exceeds a predetermined upper limit value is determined. In a case where the crimping processing time t is determined not to exceed the predetermined upper limit value in Step S27 (S27; N), the post-crimping rotational torque measurement step (S28) is performed next. On the other hand, in a case where the crimping processing time t is determined to exceed the predetermined upper limit value in Step S27 (S27; Y), the bearing device for a vehicle wheel 1 for which the crimping processing is performed is discharged as a defective product (S33). In the present embodiment, the predetermined upper limit value is set to 20 seconds.

(Post-Crimping Rotational Torque Measurement Step)

In a case where the measured crimping processing time t does not exceed the predetermined upper limit value, the post-crimping rotational torque measurement step (S28) is performed similarly to the first embodiment after the processing time determination step (S27).

(Rotational Torque Correction Step)

After the post-crimping rotational torque measurement step (S28), the rotational torque correction step (S29) is performed. In the rotational torque correction step (S29), the post-crimping rotational torque Tb measured in the post-crimping rotational torque measurement step (S28) is corrected on the basis of a temperature increase amount of the inner ring 4 due to the crimping processing, and corrected post-crimping rotational torque Tc is calculated.

When the crimping processing for crimping the small-diameter step portion 3a of the hub ring 3 to the inner ring 4 is performed, temperature increases due to plastic deformation of the crimped portion 3h in the small-diameter step portion 3a. Further, heat of the crimped portion 3h in the small-diameter step portion 3a is transmitted to the inner ring 4, and temperature of the inner ring 4 increases. Since the inner ring 4 expands as the temperature increases, the post-crimping rotational torque Tb measured in the post-crimping rotational torque measurement step (S28) has a value larger than that in a case where there is no temperature increase due to the crimping processing.

Figure 13:
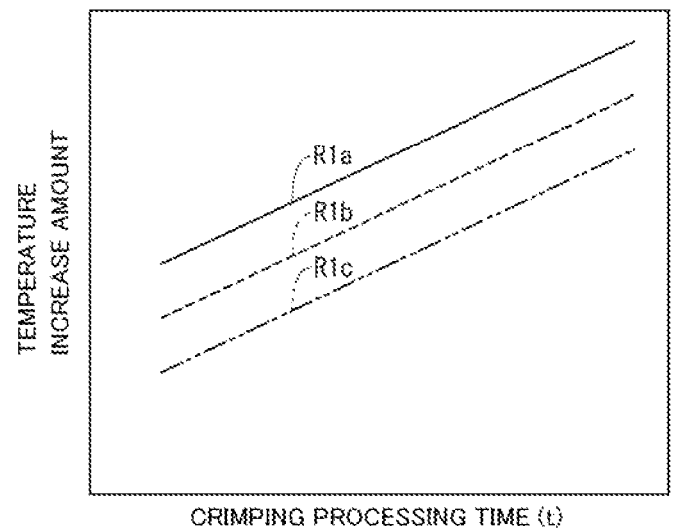
FIG. 13 is a diagram illustrating a relationship between crimping processing time and a temperature increase amount of the inner ring.

In this case, a temperature increase amount of the inner ring 4 due to the crimping processing and the crimping processing time t have a correlation, and there is a relationship in which a temperature increase amount of the inner ring 4 increases as the crimping processing time t increases (see graphs R1a, R1b, and R1c illustrated in FIG. 13). Further, since an expansion amount of the inner ring 4 increases as a temperature increase amount increases, when a temperature increase amount of the inner ring 4 increases, an increase amount of the post-crimping rotational torque Tb also increases.

Figure 14:
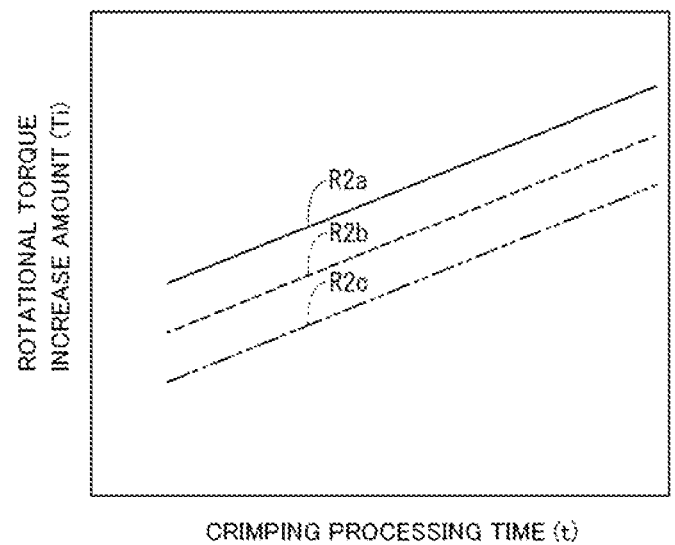
FIG. 14 is a diagram illustrating a relationship between crimping processing time and a rotational torque increase amount.

Therefore, the crimping processing time t and a rotational torque increase amount Ti which is an increase amount of the post-crimping rotational torque Tb have a correlation, and there is a relationship that the rotational torque increase amount Ti increases as the crimping processing time t increases (see graphs R2a, R2b, and R2c illustrated in FIG. 14).

From these, in the rotational torque correction step (S29), the rotational torque increase amount Ti is obtained from the crimping processing time t measured in the crimping step (S26) using the relationship between the crimping processing time t and the rotational torque increase amount Ti illustrated in FIG. 14, and the corrected post-crimping rotational torque Tc is calculated by subtracting the obtained rotational torque increase amount Ti from the post-crimping rotational torque Tb (Tc=Tb−Ti).

The relationship between the crimping processing time t and the rotational torque increase amount Ti illustrated in FIG. 14 can be obtained in advance by an experiment or the like. In this case, the relationship between the crimping processing time t and the rotational torque increase amount Ti can be obtained, for example, in a range until the crimping processing time t reaches a predetermined time. Further, the relationship between the crimping processing time t and the rotational torque increase amount Ti can be obtained for each specification of the bearing device for a vehicle wheel 1.

The relationship between the crimping processing time t and a temperature increase amount of the inner ring 4 illustrated in FIG. 13 varies depending on ambient temperature around the bearing device for a vehicle wheel 1 when the post-crimping rotational torque Tb is measured, and in a case where the crimping processing time t has the same value, a temperature increase amount decreases as the ambient temperature increases. For example, in FIG. 13, the graph R1a indicates a relationship when the ambient temperature is a° C., the graph R1b indicates a relationship when the ambient temperature is b° C. higher than a° C. (b° C.>a° C.), and the graph R1c indicates a relationship when the ambient temperature is c° C. higher than b° C. (c° C.>b° C.).

Similarly, the relationship between the crimping processing time t and the rotational torque increase amount Ti illustrated in FIG. 14 varies depending on ambient temperature around the bearing device for a vehicle wheel 1 when the post-crimping rotational torque Tb is measured, and in a case where the crimping processing time t has the same value, the rotational torque increase amount Ti decreases as the ambient temperature increases. For example, in FIG. 14, the graph R2a indicates a relationship when the ambient temperature is a° C., the graph R2b indicates a relationship when the ambient temperature is b° C., and the graph R1c indicates a relationship when the ambient temperature is c° C.

As described above, the relationship between the crimping processing time t and the rotational torque increase amount Ti varies depending on the ambient temperature. Therefore, in the preload inspection method, a relationship between the crimping processing time t and the rotational torque increase amount Ti at a plurality of ambient temperatures is obtained in advance, and when the rotational torque increase amount Ti is obtained from the crimping processing time t, the rotational torque increase amount Ti is obtained using a relationship between the crimping processing time t and the rotational torque increase amount Ti corresponding to the ambient temperature at the time of the crimping processing from a plurality of the relationships.

For example, in a case where the ambient temperature at the time of measuring the post-crimping rotational torque Tb is b° C., the rotational torque increase amount Ti is obtained from the crimping processing time t using the graph R2b of FIG. 9 illustrating a relationship between the crimping processing time t and the rotational torque increase amount Ti corresponding to b° C. In this manner, the rotational torque increase amount Ti can be obtained with high accuracy.

(Second Bearing Preload Value Calculation Step)

The second bearing preload value calculation step (S30) is performed after the rotational torque correction step (S29). In the second bearing preload value calculation step (S30), the differential torque ΔT (Tc−Ta=ΔT) between the post-press-fitting rotational torque Ta and the corrected post-crimping rotational torque Tc is calculated. Further, a preload change amount ΔP between after the press-fitting step and after the crimping processing is obtained based on the differential torque ΔT. Furthermore, the second bearing preload value P2 is calculated by adding the preload change amount ΔP to the first bearing preload value P1 calculated in the first bearing preload value calculation step (S23).

In this case, the differential torque ΔT is rotational torque increased by the crimping processing performed in the crimping step (S26). Further, the preload change amount ΔP is a preload increased by the crimping processing performed in the crimping step (S26). Both the differential torque ΔT and the preload change amount ΔP are values obtained by removing influence of a temperature increase of the inner ring 4 due to the crimping processing.

Figure 15:
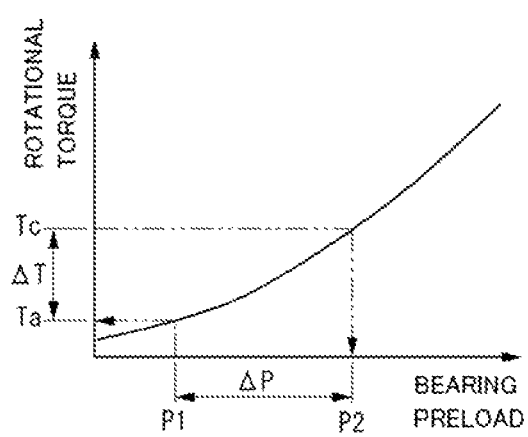
FIG. 15 is a diagram illustrating a relationship between a bearing preload and rotational torque.

As illustrated in FIG. 15, the preload change amount ΔP is calculated by applying the differential torque ΔT to a relationship between a bearing preload of the bearing device for a vehicle wheel 1 and rotational torque of the bearing which has been obtained, in advance, by an experiment or the like. Note that the relationship between a bearing preload and rotational torque of the bearing can be obtained for each specification of the bearing device for a vehicle wheel 1.

In the second bearing preload value calculation step (S30), the second bearing preload value P2 is calculated using the first bearing preload value P1 calculated based on the axial negative gap G1 between a raceway surface and a rolling body measured in the press-fitting step (S22) and the preload change amount ΔP calculated based on the post-press-fitting rotational torque Ta and the corrected post-crimping rotational torque Tc, so that the second bearing preload value P2 can be obtained with high accuracy.

(Determination Step)

After the second bearing preload value calculation step (S30), the determination step (S31) is performed. In the determination step (S31), quality of a preload applied to the bearing device for a vehicle wheel 1 is determined depending on whether or not the second bearing preload value P2 falls within a range of a predetermined reference value.

In the determination step (S31), if the second bearing preload value P2 falls within a range of a predetermined reference value, a preload applied to the bearing device for a vehicle wheel 1 is determined to be appropriate, that is, determined to be good (S31; Y), and then the inner-side seal member mounting step (S32) is performed. On the other hand, in the determination step (S31), if the second bearing preload value P2 does not fall within the range of the predetermined reference value, a preload applied to the bearing device for a vehicle wheel 1 is determined not to be appropriate, that is, determined to be not good (S31; N), and the bearing device for a vehicle wheel 1 is discharged as a defective product (S33).

In the second bearing preload value calculation step (S30), the second bearing preload value P2 is calculated after the preload change amount ΔP is obtained using the corrected post-crimping rotational torque Tc from which influence of a temperature increase of the inner ring 4 due to the crimping processing is removed, so that the second bearing preload value P2 can be calculated with high accuracy. In this manner, in the determination step (S11), influence of a temperature increase of the inner ring 4 due to the crimping processing can be suppressed, and quality of a preload applied to the bearing device for a vehicle wheel 1 can be determined with higher accuracy.

In particular, in the rotational torque correction step (S29), the rotational torque increase amount Ti, which is an increase amount of the post-crimping rotational torque Tb due to a temperature increase of the inner ring 4 caused by the crimping processing, is obtained based on the crimping processing time t, and the corrected post-crimping rotational torque Tc is calculated by subtracting the rotational torque increase amount Ti from the post-crimping rotational torque Tb. For this reason, the corrected post-crimping rotational torque Tc can be easily and accurately calculated.

Further, by calculating the corrected post-crimping rotational torque Tc based on the crimping processing time t in the rotational torque correction step (S29), it is not necessary to wait until temperature of the inner ring 4 returns to temperature before the crimping processing to perform measurement of the post-crimping rotational torque Tb after the crimping step (S26). In this manner, it is possible to measure the post-crimping rotational torque Tb for all the bearing devices for a vehicle wheel 1 and determine quality of a preload applied to the bearing device for a vehicle wheel 1 without lowering production efficiency in a mass production line. Furthermore, since the post-press-fitting rotational torque Ta and the post-crimping rotational torque Tb can be measured in the same process facility, a value of the post-press-fitting rotational torque Ta and a value of the post-crimping rotational torque Tb can be easily associated with each other for all the bearing devices for a vehicle wheel 1.

Further, in a case where a preload is calculated using rotational torque before and after the crimping processing, for example, when an abnormality such as shape collapse of an inner ring raceway surface occurs during the crimping processing, an increase amount of rotational torque before and after the crimping processing becomes large, and thus the calculated second bearing preload value P2 deviates from the range of the predetermined reference value. Therefore, by determining the calculated second bearing preload value P2 in the determination step (S31), it is possible to detect occurrence of an abnormality in the bearing device for a vehicle wheel 1 after the crimping processing, and it is possible to improve reliability of a measured value of a preload applied to the bearing device for a vehicle wheel 1. This makes it possible to inspect a preload applied to the bearing device for a vehicle wheel 1 with higher reliability.

Further, in the rotational torque correction step (S29), the rotational torque increase amount Ti is obtained using a relationship between the crimping processing time t and the rotational torque increase amount Ti corresponding to the ambient temperature during the crimping processing among relationships between the crimping processing time t and the rotational torque increase amount Ti obtained for a plurality of ambient temperatures. In this manner, the rotational torque increase amount Ti can be obtained with high accuracy, and quality of a preload applied to the bearing device for a vehicle wheel 1 can be determined with higher accuracy.

Further, a relationship between the crimping processing time t and the rotational torque increase amount Ti illustrated in FIG. 14 can be estimated on the basis of a relationship in a range obtained by an experiment or the like even outside a range actually obtained by an experiment or the like. However, when the crimping processing time t deviates significantly from the range obtained by an experiment or the like, an error generated in a relationship between the estimated crimping processing time t and the rotational torque increase amount Ti becomes large, and it may be difficult to accurately calculate the rotational torque increase amount Ti from the crimping processing time t.

In view of the above, in the present preload inspection method, whether or not the crimping processing time t exceeds a predetermined upper limit value is determined in the processing time determination step (S27), and in a case where the crimping processing time t is determined to exceed the predetermined upper limit value, it is considered difficult to correct the post-crimping rotational torque Tb with high accuracy, and the bearing device for a vehicle wheel 1 for which the crimping processing is performed is discharged as a defective product.

In this manner, accuracy of the corrected post-crimping rotational torque Tc calculated in the rotational torque correction step (S29) performed after the processing time determination step (S07) can be improved, and quality of a preload applied to the bearing device for a vehicle wheel 1 can be determined with higher accuracy in the determination step (S31).

(Inner-Side Seal Member Mounting Step)

After the determination step (S31), the inner-side seal member mounting step (S32) is performed. An assembling step of the bearing device for a vehicle wheel 1 is completed as the inner-side seal member mounting step (S32) is performed. Note that the inner-side seal member mounting step (S32) can be performed before the determination step (S31), before the second bearing preload value calculation step (S30), or before the rotational torque correction step (S09) after the post-crimping rotational torque measurement step (S28). As illustrated in FIG. 9, in the inner-side seal member mounting step (S32), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the crimping step (S26), the sliding resistance between the outer ring 2 and the inner ring 4 of the inner-side seal member 9 changes depending on the degree of crimping of the hub ring 3 in the crimping step (S26). Further, when the inner-side seal member 9 is mounted before the post-crimping rotational torque measurement step (S28) even after the crimping step (S26), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S26) or the post-crimping rotational torque measurement step (S28), there may be influence on variations in the post-crimping rotational torque Tb measured in the post-crimping rotational torque measurement step (S28). Similarly, in a case where the inner-side seal member 9 is mounted before the post-press-fitting rotational torque measurement step (S25), there may be influence on variations in the post-press-fitting rotational torque Ta measured in the post-press-fitting rotational torque measurement step (S25) depending on a mounting state of the inner-side seal member 9.

However, in the present embodiment, the inner-side seal member mounting step (S32) is performed after the post-crimping rotational torque measurement step (S28). Therefore, when the post-press-fitting rotational torque Ta and the post-crimping rotational torque Tb of the bearing device for a vehicle wheel 1 are measured in the post-press-fitting rotational torque measurement step (S25) and the post-crimping rotational torque measurement step (S28), variations in the rotational torque due to the influence of the inner-side seal member 9 are not generated, and the rotational torque of the bearing device for a vehicle wheel 1 can be measured with high accuracy.

In the present embodiment, the inner-side seal member mounting step (S32) is performed after the post-crimping rotational torque measurement step (S28), but a cap member mounting step may be performed after the post-crimping rotational torque measurement step (S28). In this case, in the cap member mounting step, a cap member is fitted to the inner-side opening portion 2a of the outer ring 2 instead of the inner-side seal member 9, and the inner-side opening portion 2a is closed by the cap member.

Fourth Embodiment

Figure 16:
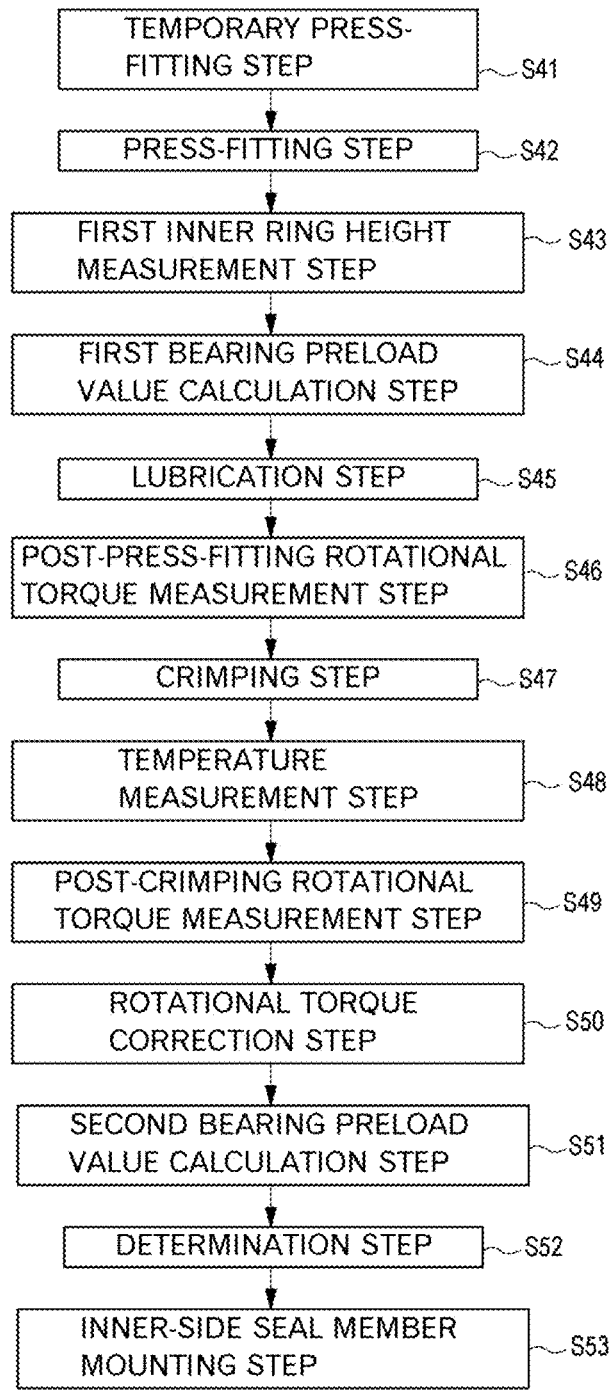
FIG. 16 is a diagram illustrating a process of the preload inspection method according to a fourth embodiment.

As illustrated in FIG. 16, the preload inspection method according to the present embodiment includes a temporary press-fitting step (S41), a press-fitting step (S42), a first inner ring height measurement step (S43), a first bearing preload value calculation step (S44), a lubrication step (S45), a post-press-fitting rotational torque measurement step (S46), a crimping step (S47), a temperature measurement step (S48), a post-crimping rotational torque measurement step (S49), a rotational torque correction step (S50), a second bearing preload value calculation step (S51), a determination step (S52), and an inner-side seal member mounting step (S53). Each step of the preload inspection method will be described below.

(Temporary Press-Fitting Step)
Since this step is similar to that of the first embodiment, description of this step will be omitted.

(Press-Fitting Step)
After the temporary press-fitting step (S41), the press-fitting step (S42) is performed. As illustrated in FIG. 4, in the press-fitting step (S42), the inner ring 4 is press-fitted into the small-diameter step portion 3a to a position where the outer-side end surface 4c of the inner ring 4 abuts on the shoulder portion 3e of the hub ring 3.

(First Inner Ring Height Measurement Step)
The first inner ring height measurement step (S43) is performed after the press-fitting step (S42). As illustrated in FIG. 4, in the inner ring height measurement step (S43), after completion of press-fitting of the inner ring 4 into the small-diameter step portion 3a, a first inner ring height H1, which is an axial dimension between the outer-side end surface 3g of the hub ring 3 and the inner-side end surface 4b of the inner ring 4 after the press-fitting of the inner ring 4, is measured. Further, a value obtained by subtracting the first inner ring height H1 from the axial dimension H0 is subtracted from the axial positive gap G0 between a raceway surface and a rolling body measured in the temporary press-fitting step (S41) to obtain the axial negative gap G1 between a raceway surface and a rolling body after the press-fitting of the inner ring 4 (G1=G0−(H0−H1)).

(First Bearing Preload Value Calculation Step)
Since this step is similar to that of the first embodiment, description of this step will be omitted.

(Lubrication Step)
Since this step is similar to that of the first embodiment, description of this step will be omitted.

(Post-Press-Fitting Rotational Torque Measurement Step)
Since this step is similar to that of the first embodiment, description of this step will be omitted.

(Crimping Step)
Since this step is similar to that of the first embodiment, description of this step will be omitted.

Figure 17:
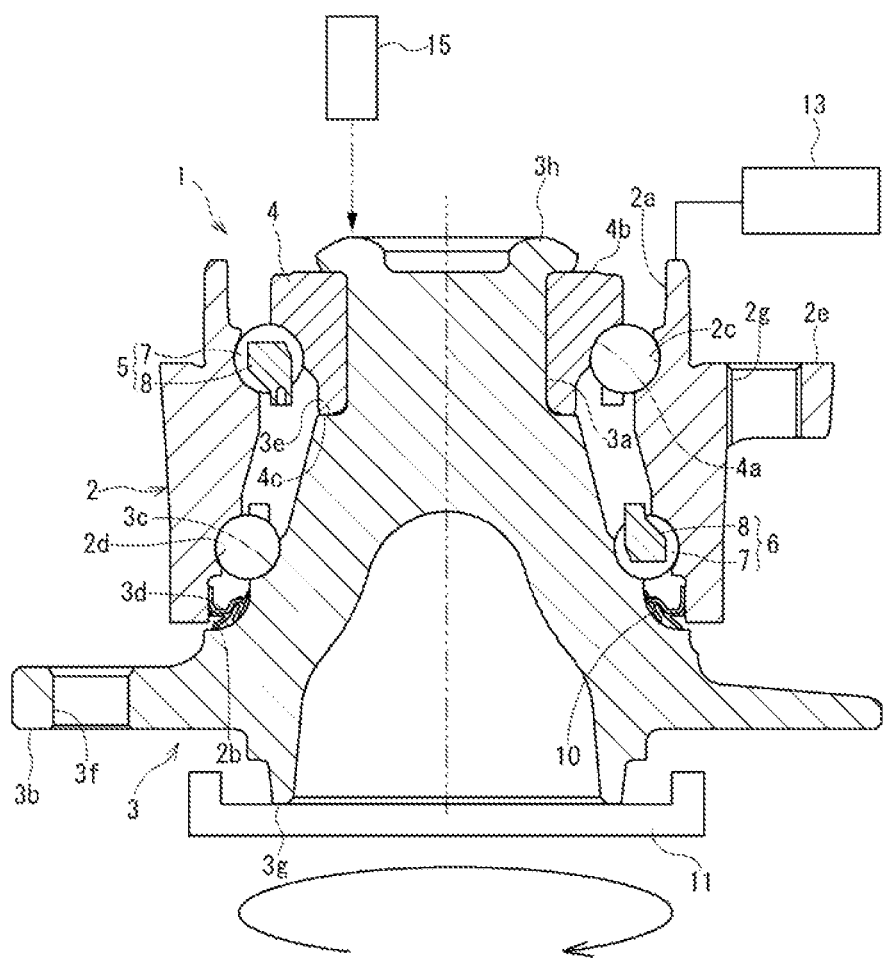
FIG. 17 is a side cross-sectional view illustrating the bearing device for a vehicle wheel in a state where temperature measurement of a crimped portion in the hub ring is being performed.

(Temperature Measurement Step)
The temperature measurement step (S48) is performed after the crimping step (S47). In the temperature measurement step (S48), a temperature ti0 of the crimped portion between the hub ring 3 and the inner ring 4 after completion of the crimping processing is measured. As illustrated in FIG. 17, in the present embodiment, after completion of the crimping processing, the temperature ti0 of the crimped portion 3h formed in an inner-side end portion of the hub ring 3 is measured by a temperature sensor 15. The temperature ti0 of the crimped portion 3h can be measured immediately after the crimping processing is completed or after a certain period of time elapses after the crimping processing is completed.

The temperature sensor 15 is attached to, for example, a crimping machine including the crimping punch 14. That is, the temperature ti0 of the crimped portion 3h can be measured by the temperature sensor 15 attached to the crimping machine. In this manner, the temperature ti0 of the crimped portion 3h is measured by the temperature sensor 15 attached to the crimping machine, so that the temperature ti0 of the crimped portion 3h can be smoothly measured after the crimping step (S47) is performed.

As the temperature sensor 15, a contact type temperature sensor or a non-contact type temperature sensor can be used. In a case where the temperature sensor 15 is a contact type temperature sensor, the temperature ti0 of the crimped portion 3h can be directly measured in a state where a contact of the temperature sensor 15 is in contact with the crimped portion 3h. In this case, the contact of the temperature sensor 15 can be configured to be movable up and down with respect to the crimped portion 3h, the contact can be lowered to be brought into contact with the crimped portion 3h when the temperature ti0 is measured, and the contact can be raised to be separated from the crimped portion 3h when measurement of the temperature ti0 is completed. Further, in a case where the temperature sensor 15 is a non-contact type temperature sensor, the temperature ti0 of the crimped portion 3h can be measured in a state where the temperature sensor 15 is arranged at a position away from the crimped portion 3h.

In the present embodiment, the temperature ti0 of the crimped portion 3h of the hub ring 3 is measured from the inner side in the axial direction, but temperature of the inner-side end surface 4b of the inner ring 4 can also be measured. However, since the crimped portion 3h is located further on the inner side in the axial direction than the inner-side end surface 4b, it is easier to measure the temperature ti0 of the crimped portion 3h than to measure temperature of the inner-side end surface 4b.

(Post-Crimping Rotational Torque Measurement Step)

Since this step is similar to that of the first embodiment, description of this step will be omitted.

(Rotational Torque Correction Step)

After the post-crimping rotational torque measurement step (S49), the rotational torque correction step (S50) is performed. In the rotational torque correction step (S50), the post-crimping rotational torque Tb measured in the post-crimping rotational torque measurement step (S49) is corrected on the basis of the temperature ti0 of the crimped portion 3h measured in the temperature measurement step (S08), and the corrected post-crimping rotational torque Tc is calculated.

When the crimping processing for crimping the small-diameter step portion 3a of the hub ring 3 to the inner ring 4 is performed, temperature increases due to plastic deformation of the crimped portion 3h in the small-diameter step portion 3a. Further, heat of the crimped portion 3h in the small-diameter step portion 3a is transmitted to the inner ring 4, and temperature of the inner ring 4 increases. Since the inner ring 4 expands as the temperature increases, the post-crimping rotational torque Tb measured in the post-crimping rotational torque measurement step (S49) has a value larger than that in a case where there is no temperature increase due to the crimping processing.

Therefore, in the rotational torque correction step (S50), the post-crimping rotational torque Tb is corrected as described below, and the corrected post-crimping rotational torque Tc, which is a value of post-crimping rotational torque in a case where there is no temperature increase due to the crimping processing in the inner ring 4, is calculated. Note that temperature of the inner ring 4 in a case where there is no temperature increase due to the crimping processing is equal to ambient temperature around the bearing device for a vehicle wheel 1.

Figure 18:
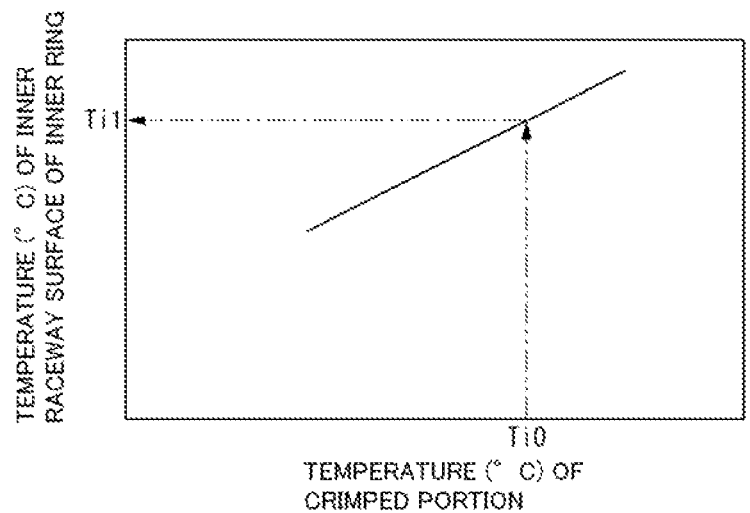
FIG. 18 is a diagram illustrating a relationship between temperature of the crimped portion of the hub ring and temperature of an inner raceway surface of the inner ring.

First, in the rotational torque correction step (S50), temperature ti1 of the inner raceway surface 4a after completion of the crimping processing is calculated using a relationship between temperature of the crimped portion 3h and temperature of the inner raceway surface 4a of the inner ring 4 illustrated in FIG. 18 from the temperature ti0 of the crimped portion 3h measured in the temperature measurement step (S48). Here, the relationship between temperature of the crimped portion 3h and temperature of the inner raceway surface 4a of the inner ring 4 illustrated in FIG. 18 can be obtained in advance by an experiment or the like. The relationship between temperature of the crimped portion 3h and temperature of the inner raceway surface 4a of the inner ring 4 can be obtained for each specification of the bearing device for a vehicle wheel 1.

Figure 19:
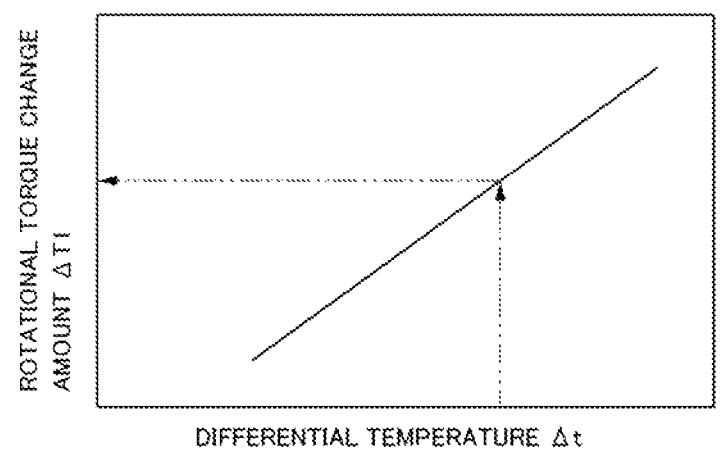
FIG. 19 is a diagram illustrating a relationship between temperature of the inner raceway surface of the inner ring and time.

In the rotational torque correction step (S50), a rotational torque change amount $\Delta T1$ due to a temperature change of the inner ring 4 is further obtained based on a differential temperature $\Delta t$ ($\Delta t=ti1-t0$) between the temperature ti1 of the inner raceway surface 4a after the crimping step, at which the post-crimping rotational torque Tb is measured, and ambient temperature t0 around the bearing device for a vehicle wheel 1, which is temperature equivalent to temperature of the inner raceway surface 4a before the crimping processing. In this case, as illustrated in FIG. 19, the rotational torque change amount $\Delta T1$ is calculated by applying the differential temperature $\Delta t$ to a relationship between the differential temperature $\Delta t$ and the rotational torque change amount $\Delta T1$ that is obtained in advance by an experiment or the like and. Note that the relationship between the differential temperature $\Delta t$ and the rotational torque change amount $\Delta T1$ can be obtained for each specification of the bearing device for a vehicle wheel 1.

Figure 20:
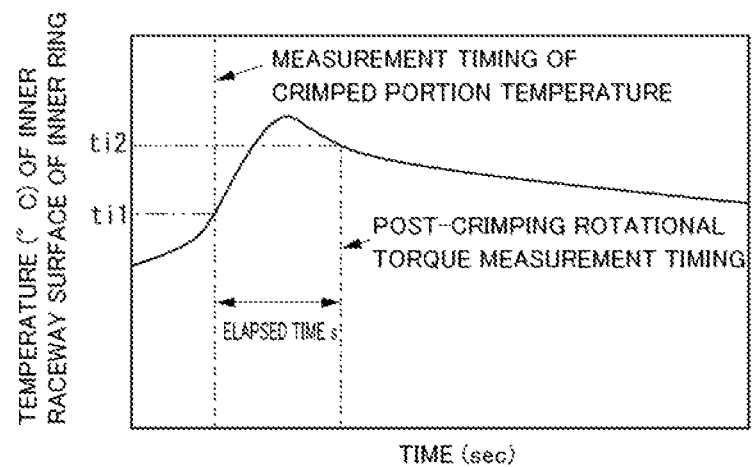
FIG. 20 is a diagram illustrating a relationship between a rotational torque change amount and differential temperature before and after crimping.

Here, in actuality, since there exists elapsed time s from the crimping processing to measurement of the post-crimping rotational torque and there is a temperature change, a method described below may be employed to improve accuracy of the post-crimping rotational torque Tb. As illustrated in FIG. 20, temperature ti2 of the inner raceway surface 4a at the time of measurement of the post-crimping rotational torque Tb is calculated using a relationship between temperature of the inner raceway surface 4a of the inner ring 4 and time, based on the elapsed time s from measurement of the temperature ti0 of the post-crimped portion 3h (a measurement timing of the crimped portion temperature) to measurement of the post-crimping rotational torque Tb (a measurement timing of the post-crimping rotational torque) and the temperature ti1 of the inner raceway surface 4a after completion of the crimping processing. Here, a relationship between temperature of the inner raceway surface 4a and time illustrated in FIG. 20 can be obtained in advance by an experiment or the like. Further, the relationship between temperature of the inner raceway surface 4a and time can be obtained for each specification of the bearing device for a vehicle wheel 1.

In the relationship between temperature of the inner raceway surface 4a and time illustrated in FIG. 20, temperature of the inner raceway surface 4a when the temperature ti0 of the crimped portion 3h is measured is ti1, and then the temperature of the inner raceway surface 4a increases. This is because, after the temperature ti0 of the crimped portion 3h is measured, heat of the crimped portion 3h having increased temperature is transmitted to the inner raceway surface 4a of the inner ring 4. In FIG. 20, measurement of the post-crimping rotational torque Tb is performed at a timing when temperature of the inner raceway surface 4a increases from ti1 and then slightly falls to ti2.

As described above, in a case where the temperature ti2 is obtained, the rotational torque change amount $\Delta T1$ is obtained based on the differential temperature $\Delta t$ ($\Delta t=ti2-t0$) between the temperature ti2 and the ambient temperature to.

After the rotational torque change amount $\Delta T1$ is obtained, the corrected post-crimping rotational torque Tc (Tc=Tb−$\Delta T1$) is calculated by subtracting the rotational torque change amount $\Delta T1$ from the post-crimping rotational torque Tb.

(Second Bearing Preload Value Calculation Step)

The second bearing preload value calculation step (S51) is performed after the rotational torque correction step (S50). In the second bearing preload value calculation step (S51), differential torque ΔT2 (ΔT2=Tc−Ta) between the post-press-fitting rotational torque Ta and the corrected post-crimping rotational torque Tc is calculated. Further, the preload change amount ΔP between after the press-fitting step and after the crimping processing is obtained based on the differential torque ΔT2. Furthermore, the second bearing preload value P2 is calculated by adding the preload change amount ΔP to the first bearing preload value P1 calculated in the first bearing preload value calculation step (S44).

In this case, the differential torque ΔT2 is rotational torque increased by the crimping processing performed in the crimping step (S47). Further, the preload change amount ΔP is a preload increased by the crimping processing performed in the crimping step (S47). Both the differential torque ΔT2 and the preload change amount ΔP are values obtained by removing influence of a temperature increase of the inner ring 4 due to the crimping processing.

Figure 21:
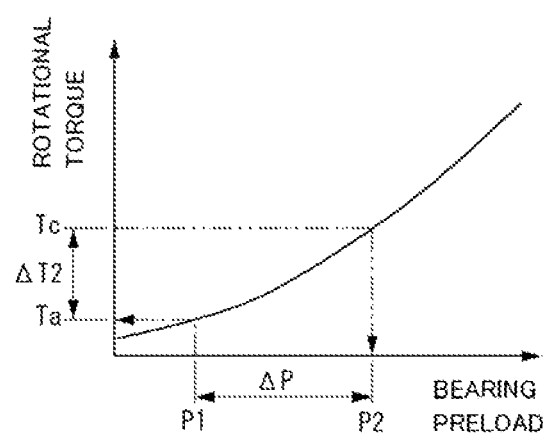
FIG. 21 is a diagram illustrating a relationship between a bearing preload and rotational torque.

As illustrated in FIG. 21, the preload change amount ΔP is calculated by applying the differential torque ΔT2 to a relationship between a bearing preload of the bearing device for a vehicle wheel 1 and rotational torque of the bearing which has been obtained, in advance, by an experiment or the like. Note that the relationship between a bearing preload and rotational torque of the bearing can be obtained for each specification of the bearing device for a vehicle wheel 1.

In the second bearing preload value calculation step (S51), the second bearing preload value P2 is calculated using the first bearing preload value P1 calculated based on the axial negative gap G1 and the preload change amount ΔP calculated based on the post-press-fitting rotational torque Ta and the corrected post-crimping rotational torque Tc, so that the second bearing preload value P2 can be obtained with high accuracy.

(Determination Step)

A step similar to that in the first embodiment is performed.

In the second bearing preload value calculation step (S51), the corrected post-crimping rotational torque Tc from which influence of a temperature increase of the inner ring 4 due to the crimping processing is removed is obtained based on the temperature ti0 of the crimped portion 3h measured after completion of the crimping processing, and the second bearing preload value P2 is calculated using the corrected post-crimping rotational torque Tc, so that the second bearing preload value P2 can be calculated with high accuracy. In this manner, in the determination step (S52), influence of a temperature increase of the inner ring 4 due to the crimping processing can be considered, and quality of a preload applied to the bearing device for a vehicle wheel 1 can be determined with higher accuracy.

In particular, in the rotational torque correction step (S50), the temperature ti1 of the inner raceway surface 4a after completion of the crimping processing is calculated from the temperature ti0 of the crimped portion 3h measured in the temperature measurement step (S48), the temperature ti2 of the inner raceway surface 4a at the time of measurement of the post-crimping rotational torque Tb is calculated from the elapsed time s from measurement of the temperature ti0 of the crimped portion 3h to measurement of the post-crimping rotational torque Tb and the temperature ti1, the rotational torque change amount ΔT1 due to a temperature change of the inner ring 4 is obtained based on the differential temperature Δt between the temperature ti2 and the ambient temperature t0, and the corrected post-crimping rotational torque Tc is calculated by subtracting the rotational torque change amount ΔT1 from the post-crimping rotational torque Tb. For this reason, the corrected post-crimping rotational torque Tc can be easily calculated with high accuracy.

Further, in the rotational torque correction step (S50), the corrected post-crimping rotational torque Tc is calculated based on the temperature ti0 of the crimped portion 3h and the elapsed time s, so that it is not necessary to wait until temperature of the inner ring 4 returns to temperature before the crimping processing to perform measurement of the post-crimping rotational torque Tb after the crimping step (S47). This makes it possible to determine quality of a preload applied to the bearing device for a vehicle wheel 1 without lowering production efficiency in a mass production line.

Further, in a case where a preload is calculated using rotational torque before and after the crimping processing, for example, when an abnormality such as shape collapse of an inner ring raceway surface occurs during the crimping processing, an increase amount of rotational torque before and after the crimping processing becomes large, and thus the calculated second bearing preload value P2 deviates from the range of the predetermined reference value. Therefore, by determining the calculated second bearing preload value P2 in the determination step (S52), it is possible to detect occurrence of an abnormality in the bearing device for a vehicle wheel 1 after the crimping processing, and it is possible to improve reliability of a measured value of a preload applied to the bearing device for a vehicle wheel 1. This makes it possible to inspect a preload applied to the bearing device for a vehicle wheel 1 with higher reliability.

(Inner-Side Seal Member Mounting Step)

After the determination step (S52), the inner-side seal member mounting step (S13) is performed. An assembling step of the bearing device for a vehicle wheel 1 is completed as the inner-side seal member mounting step (S53) is performed. Note that the inner-side seal member mounting step (S53) can be performed before the determination step (S52), before the second bearing preload value calculation step (S51), or before the rotational torque correction step (S50) after the post-crimping rotational torque measurement step (S49). As illustrated in FIG. 9, in the inner-side seal member mounting step (S53), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the crimping step (S47), the sliding resistance between the outer ring 2 and the inner ring 4 of the inner-side seal member 9 changes depending on the degree of crimping of the hub ring 3 in the crimping step (S47). Further, when the inner-side seal member 9 is mounted before the post-crimping rotational torque measurement step (S49) even after the crimping step (S47), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S47) or the post-crimping rotational torque measurement step (S49), there may be influence on variations in the post-crimping rotational torque Tb measured in the post-crimping rotational torque measurement step (S49). Similarly, in a case where the inner-side seal member 9 is mounted before the post-press-fitting rotational torque measurement step (S46), there may be influence on variations in the post-press-fitting rotational torque Ta measured in the post-press-fitting rotational torque measurement step (S46) depending on a mounting state of the inner-side seal member 9.

However, in the present embodiment, the inner-side seal member mounting step (S53) is performed after the post-crimping rotational torque measurement step (S49). Therefore, when the post-press-fitting rotational torque Ta and the post-crimping rotational torque Tb of the bearing device for a vehicle wheel 1 are measured in the post-press-fitting rotational torque measurement step (S46) and the post-crimping rotational torque measurement step (S49), variations in the rotational torque due to the influence of the inner-side seal member 9 are not generated, and the rotational torque of the bearing device for a vehicle wheel 1 can be measured with high accuracy.

In the present embodiment, the inner-side seal member mounting step (S53) is performed after the post-crimping rotational torque measurement step (S49), but a cap member mounting step may be performed after the post-crimping rotational torque measurement step (S49). In this case, in the cap member mounting step, a cap member is fitted to the inner-side opening portion 2a of the outer ring 2 instead of the inner-side seal member 9, and the inner-side opening portion 2a is closed by the cap member.

Fifth Embodiment

Figure 22:
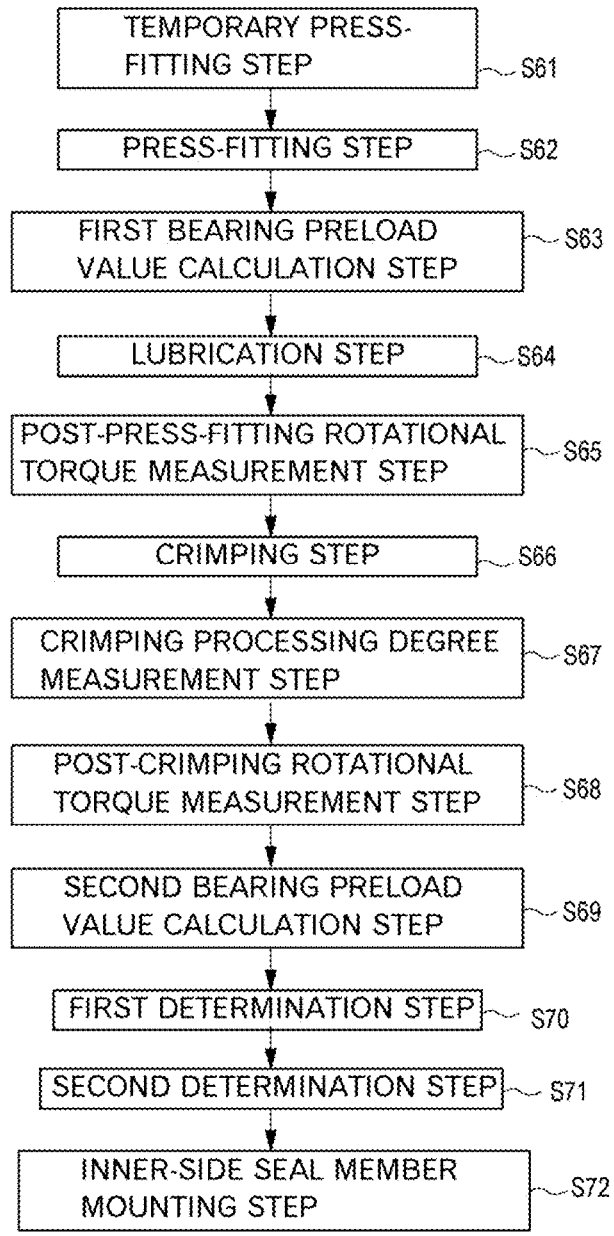
FIG. 22 is a diagram illustrating a process of the preload inspection method according to a fifth embodiment.

As illustrated in FIG. 22, the preload inspection method according to the present embodiment includes a temporary press-fitting step (S61), a press-fitting step (S62), a first bearing preload value calculation step (S63), a lubrication step (S64), a post-press-fitting rotational torque measurement step (S65), a crimping step (S66), a crimping processing degree measurement step (S67), a post-crimping rotational torque measurement step (S68), a second bearing preload value calculation step (S69), a first determination step (S70), a second determination step (S71), and an inner-side seal member mounting step (S72). Each step of the preload inspection method will be described below.
(Temporary Press-Fitting Step)
Since this step is similar to that of the first embodiment, description of this step will be omitted.
(Press-Fitting Step)
Since this step is similar to that of the first embodiment, description of this step will be omitted.
(First Bearing Preload Value Calculation Step)
Since this step is similar to that of the first embodiment, description of this step will be omitted.
(Lubrication Step)
Since this step is similar to that of the first embodiment, description of this step will be omitted.
(Post-Press-Fitting Rotational Torque Measurement Step)
Since this step is similar to that of the first embodiment, description of this step will be omitted.
(Crimping Step)
Since this step is similar to that of the first embodiment, description of this step will be omitted.
(Crimping Processing Degree Measurement Step)
After the crimping step (S06), the crimping processing degree measurement step (S67) is performed. In the crimping processing degree measurement step (S67), crimping processing degree of the crimped portion 3h formed by crimping processing is measured.

Here, the crimping processing degree is degree of deformation of the crimped portion 3h plastically deformed by the crimping processing, and can be expressed by a shape of the crimped portion 3h. Further, a shape of the crimped portion 3h to be measured includes a height dimension h in the axial direction of the crimped portion 3h, an outer diameter dimension r in a direction orthogonal to the axial direction of the crimped portion 3h, and the like. That is, the crimping processing degree includes the height dimension h of the crimped portion 3h in the axial direction and the outer diameter dimension r of the crimped portion 3h in the direction orthogonal to the axial direction.

In the present embodiment, the crimping processing degree of the crimped portion 3h is measured by measurement of the height dimension h and the outer diameter dimension r. However, the crimping processing degree of the crimped portion 3h can be measured by measurement of only one of the height dimension h and the outer diameter dimension r.

Figure 23:
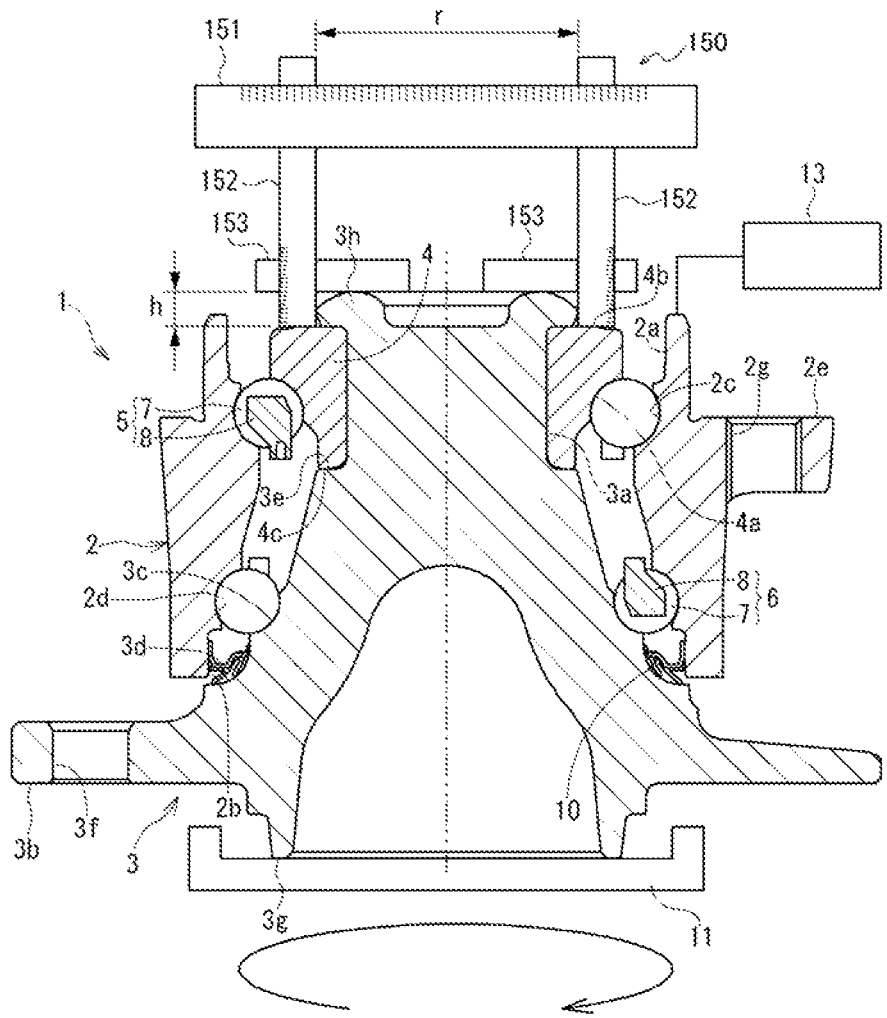
FIG. 23 is a side cross-sectional view illustrating the bearing device for a vehicle wheel in a state where a height dimension and an outer diameter dimension of the crimped portion are measured by a contact type measuring instrument.

As illustrated in FIG. 23, the height dimension h and the outer diameter dimension r, which are the crimping processing degrees of the crimped portion 3h, can be measured using, for example, a measuring instrument 150. The measuring instrument 150 is a contact type measuring instrument that performs measurement by bringing a contact into contact with the crimped portion 3h, and includes a main body portion 151, a first contact 152, and a second contact 153.

The main body portion 151 is an elongated member extending along a direction orthogonal to the axial direction, and supports the first contact 152 in a manner that the first contact 152 is movable along the direction orthogonal to the axial direction.

The first contact 152 is an elongated member extending along the axial direction, and a pair of the first contacts 152 are provided on the main body portion 151. When the height dimension h and the outer diameter dimension r are measured, the first contact 152 comes into contact with the inner-side end surface 4b of the inner ring 4 and an outer diameter edge portion in a direction orthogonal to the axial direction of the crimped portion 3h.

The second contact 153 is an elongated member extending along a direction orthogonal to the axial direction, and is supported by the first contact 152 so as to be movable along the axial direction. The second contact 153 comes into contact with an inner-side end surface in the axial direction of the crimped portion 3h when the height dimension h and the outer diameter dimension r are measured.

When the height dimension h of the crimped portion 3h is measured using the measuring instrument 150 configured as described above, the second contact 153 is moved along the axial direction with respect to the first contact 152, a tip of the first contact 152 is caused to abut on the inner-side end surface 4b of the inner ring 4, and the second contact 153 is brought into contact with an inner-side end surface of the crimped portion 3h. After the above, an axial length from a tip of the first contact 152 to the second contact 153 is measured to measure an axial dimension from the inner-side end surface 4b to an inner-side end surface of the crimped portion 3h, which is the height dimension h of the crimped portion 3h.

Further, when the outer diameter dimension r of the crimped portion 3h is measured using the measuring instrument 150, the first contact 152 is moved in a direction orthogonal to the axial direction with respect to the main body portion 151, and the first contact 152 is brought into contact with an outer diameter edge portion of the crimped portion 3h. After the above, a length between the first contact 152 and the first contact 152 in a direction orthogonal to the axial direction is measured to measure the outer diameter dimension r of the crimped portion $3h$.

Note that, in the present embodiment, the crimping processing degree of the crimped portion $3h$ is measured using the measuring instrument 150 including the main body portion 151, the first contact 152, and the second contact 153, but the present invention is not limited to this, and the crimping processing degree of the crimped portion $3h$ can also be measured by a contact type measuring instrument having another configuration. As described above, in a case where the crimping processing degree is measured using a contact type measuring instrument, it is easy to make the measuring instrument have a simple configuration.

Figure 24:
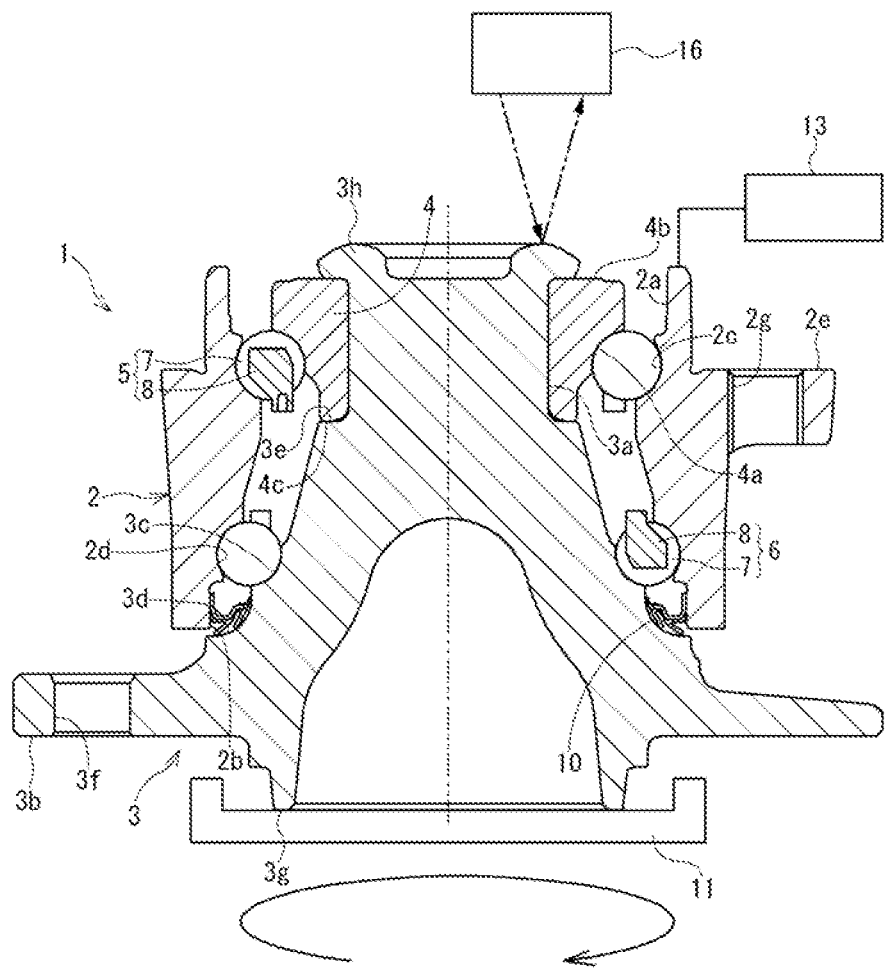
FIG. 24 is a side cross-sectional view illustrating the bearing device for a vehicle wheel in a state where a height dimension of the crimped portion is measured by a non-contact type measuring instrument.

Further, measurement of the crimping processing degree of the crimped portion $3h$ can be performed using a non-contact type measuring instrument that performs measurement without being in contact with the crimped portion $3h$. As a non-contact type measuring instrument, for example, as illustrated in FIG. 24, a laser displacement meter that measures the height dimension h and the like of the crimped portion $3h$ by irradiating the crimped portion $3h$ with a laser can be used. Further, it is also possible to measure the height dimension h, the outer diameter dimension r, and the like of the crimped portion $3h$ by capturing an image of the crimped portion $3h$ and processing the captured image of the crimped portion $3h$. As described above, in a case where the crimping processing degree is measured using a non-contact type measuring instrument, measurement can be performed without contact with the crimped portion $3h$, so that the crimping processing degree can be easily measured in a manufacturing line in which the bearing device for a vehicle wheel 1 is assembled.

(Post-Crimping Rotational Torque Measurement Step)

A step similar to that in the first embodiment is performed.

Note that, in the present embodiment, the post-crimping rotational torque measurement step (S68) is performed after the crimping processing degree measurement step (S67), but the crimping processing degree measurement step (S67) can be performed after the post-crimping rotational torque measurement step (S68).

(Second Bearing Preload Value Calculation Step)

Since this step is similar to that of the first embodiment, description of this step will be omitted.

(First Determination Step)

Since the first determination step (S70) is similar to the determination step (S09) of the first embodiment, description of this step will be omitted.

(Second Determination Step)

After the first determination step (S70), the second determination step (S71) is performed. In the second determination step (S71), the crimping processing degree of the crimped portion $3h$ is collated with a value of the differential torque $\Delta T$, and presence or absence of a crimping abnormality is determined based on whether a value of the differential torque $\Delta T$ with respect to the crimping processing degree of the crimped portion $3h$ falls within a range of a torque reference value.

Figure 25A:
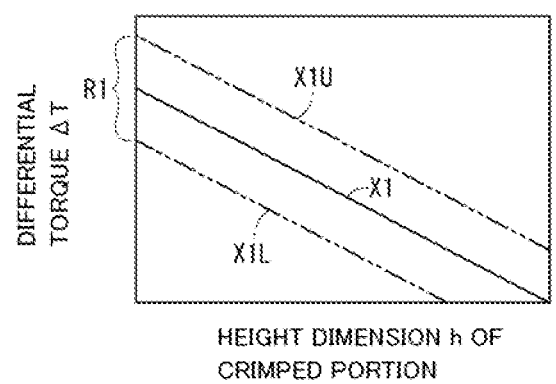
FIG. 25A is a diagram illustrating a relationship between a height dimension of the crimped portion and differential torque.
Figure 25B:
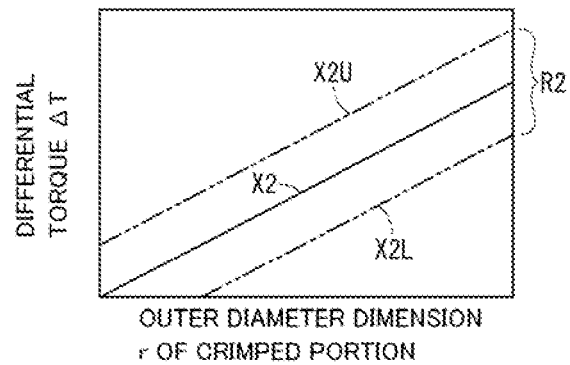
FIG. 25B is a diagram illustrating a relationship between an outer diameter dimension of the crimped portion and differential torque.

Specifically, as illustrated in FIG. 25A, a first relational line X1 representing a relationship between the height dimension h of the crimped portion $3h$ and the differential torque $\Delta T$ is obtained in advance by an experiment or the like, and a range between an upper limit value X1U and a lower limit value X1L of a value of the differential torque $\Delta T$ with respect to the height dimension h is set in advance as a range R1 of a first torque reference value when presence or absence of a crimping abnormality is determined. Further, as illustrated in FIG. 25B, a second relational line X2 representing a relationship between the outer diameter dimension r of the crimped portion $3h$ and the differential torque $\Delta T$ is obtained in advance by an experiment or the like, and a range between an upper limit value X2U and a lower limit value X2L of a value of the differential torque $\Delta T$ with respect to the outer diameter dimension r is set in advance as a range R2 of a second torque reference value when presence or absence of a crimping abnormality is determined.

Then, the height dimension h and the outer diameter dimension r of the crimped portion $3h$ are collated with a value of the differential torque $\Delta T$, and presence or absence of a crimping abnormality is determined based on whether or not the value of the differential torque $\Delta T$ with respect to the height dimension h is within the range R1 of the first torque reference value and whether the value of the differential torque $\Delta T$ with respect to the outer diameter dimension r is within the range R2 of the second torque reference value.

In this case, for example, when the height dimension h and the outer diameter dimension r are collated with a value of the differential torque $\Delta T$, in a case where the value of the differential torque $\Delta T$ with respect to the height dimension h falls within the range R1 of the first torque reference value and the value of the differential torque $\Delta T$ with respect to the outer diameter dimension r falls within the range R2 of the second torque reference value, no crimping abnormality is determined to occur. Further, when the height dimension h and the outer diameter dimension r are collated with a value of the differential torque $\Delta T$, in a case where at least the value of the differential torque $\Delta T$ with respect to the height dimension h does not fall within the range R1 of the first torque reference value or the value of the differential torque $\Delta T$ with respect to the outer diameter dimension r does not fall within the range R2 of the second torque reference value, a crimping abnormality is determined to occur.

As described above, by determining presence or absence of a crimping abnormality based on the crimping processing degree represented by a crimping shape such as the height dimension h and the outer diameter dimension r of the crimped portion $3h$, it is possible to detect deformation of the inner raceway surface $4a$ of the inner ring 4 caused by, for example, deviation in a shape of the crimped portion $3h$. In this case, since the determination of presence or absence of a crimping abnormality is performed by collating the crimping processing degree of the crimped portion $3h$ with a value of the differential torque $\Delta T$, it is possible to detect not only deformation of the inner raceway surface $4a$, that is large in degree and can be detected by the determination of appropriateness or inappropriateness of a preload but also deformation of the inner raceway surface $4a$, that is small in degree.

Further, in the present preload inspection method, the height dimension h and the outer diameter dimension r are used as the crimping processing degree to be measured, but since the height dimension h and the outer diameter dimension r are relatively easy to measure, it is possible to measure the crimping processing degree without lowering production efficiency in a mass production line.

Further, in the second determination step (S71), whether or not the bearing device for a vehicle wheel 1 after the crimping processing is a non-defective product is determined on the basis of a determination result on appropriateness or inappropriateness of a preload in the first determination step (S70) and a determination result on presence or absence of a crimping abnormality in the second determination step (S71).

For example, in a case where a preload of the bearing device for a vehicle wheel 1 is determined to be appropriate in the first determination step (S70) and no crimping abnormality is determined to occur in the second determination step (S71), the bearing device for a vehicle wheel 1 after the crimping processing is determined to be a non-defective product. Further, at least in a case where a preload of the bearing device for a vehicle wheel 1 is determined to be not appropriate in the first determination step (S70) or in a case where a crimping abnormality is determined to occur in the second determination step (S71), the bearing device for a vehicle wheel 1 after the crimping processing is determined not to be a non-defective product.

As described above, by performing the second determination step (S71) in addition to the first determination step (S70), the determination on appropriateness or inappropriateness of a preload in the first determination step (S70) can be complemented by the determination on presence or absence of a crimping abnormality in the second determination step (S71). In this manner, it is possible to further improve reliability when determining appropriateness or inappropriateness of a preload applied to the bearing device for a vehicle wheel 1, and to manufacture the bearing device for a vehicle wheel 1 with higher quality.

Further, by measuring the crimping processing degree such as the height dimension h and the outer diameter dimension r in the preload inspection method, a shape of the crimped portion 3h can be grasped, and a crimping condition can be set based on the grasped shape of the crimped portion 3h, and the crimped portion 3h can be adjusted to an appropriate shape. In this manner, a shape of the crimped portion 3h can be equalized in each of a plurality of manufacturing bases and manufacturing lots, and the bearing device for a vehicle wheel 1 having uniform quality can be manufactured.

Note that, in the present embodiment, both the height dimension h and the outer diameter dimension r are measured as the measurement of the crimping processing degree, but it is also possible to measure only one of the height dimension h and the outer diameter dimension r as the crimping processing degree. As described above, even in a case where one of the height dimension h and the outer diameter dimension r is measured, it is possible to further improve reliability when determining appropriateness or inappropriateness of a preload applied to the bearing device for a vehicle wheel 1, and to manufacture the bearing device for a vehicle wheel 1 with higher quality.

However, in a case where both the height dimension h and the outer diameter dimension r are measured, it is possible to more accurately determine presence or absence of a crimping abnormality than in a case where one of the height dimension h and the outer diameter dimension r is measured, and it is possible to further improve reliability at the time of determination of appropriateness or inappropriateness of a preload.

In the present embodiment, after determination of appropriateness or inappropriateness of a preload is performed in the first determination step (S70), determination of presence or absence of a crimping abnormality is performed in the second determination step (S71). However, the determination of appropriateness or inappropriateness of a preload may be performed in the second determination step (S71) after the determination of presence or absence of a crimping abnormality is performed in the first determination step (S70).

(Inner-Side Seal Member Mounting Step)

After the second determination step (S71), the inner-side seal member mounting step (S72) is performed. An assembling step of the bearing device for a vehicle wheel 1 is completed as the inner-side seal member mounting step (S72) is performed. Note that the inner-side seal member mounting step (S72) can be performed before the second determination step (S71), before the first determination step (S70), or before the second bearing preload value calculation step (S69) as long as the inner-side seal member mounting step (S72) is performed after the post-crimping rotational torque measurement step (S68). As illustrated in FIG. 9, in the inner-side seal member mounting step (S72), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the crimping step (S66), the sliding resistance between the outer ring 2 and the inner ring 4 of the inner-side seal member 9 changes depending on the degree of crimping of the hub ring 3 in the crimping step (S66). Further, when the inner-side seal member 9 is mounted before the post-crimping rotational torque measurement step (S68) even after the crimping step (S66), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S66) or the post-crimping rotational torque measurement step (S68), there may be influence on variations in the post-crimping rotational torque Tb measured in the post-crimping rotational torque measurement step (S68). Similarly, in a case where the inner-side seal member 9 is mounted before the post-press-fitting rotational torque measurement step (S65), there may be influence on variations in the post-press-fitting rotational torque Ta measured in the post-press-fitting rotational torque measurement step (S65) depending on a mounting state of the inner-side seal member 9.

However, in the present embodiment, the inner-side seal member mounting step (S72) is performed after the post-crimping rotational torque measurement step (S68). Therefore, when the post-press-fitting rotational torque Ta and the post-crimping rotational torque Tb of the bearing device for a vehicle wheel 1 are measured in the post-press-fitting rotational torque measurement step (S65) and the post-crimping rotational torque measurement step (S68), variations in the rotational torque due to the influence of the inner-side seal member 9 are not generated, and the rotational torque of the bearing device for a vehicle wheel 1 can be measured with high accuracy.

In the present embodiment, the inner-side seal member mounting step (S72) is performed after the post-crimping rotational torque measurement step (S68), but a cap member mounting step may be performed after the post-crimping rotational torque measurement step (S68). In this case, in the cap member mounting step, a cap member is fitted to the inner-side opening portion 2a of the outer ring 2 instead of the inner-side seal member 9, and the inner-side opening portion 2a is closed by the cap member.

Sixth Embodiment

Figure 26:
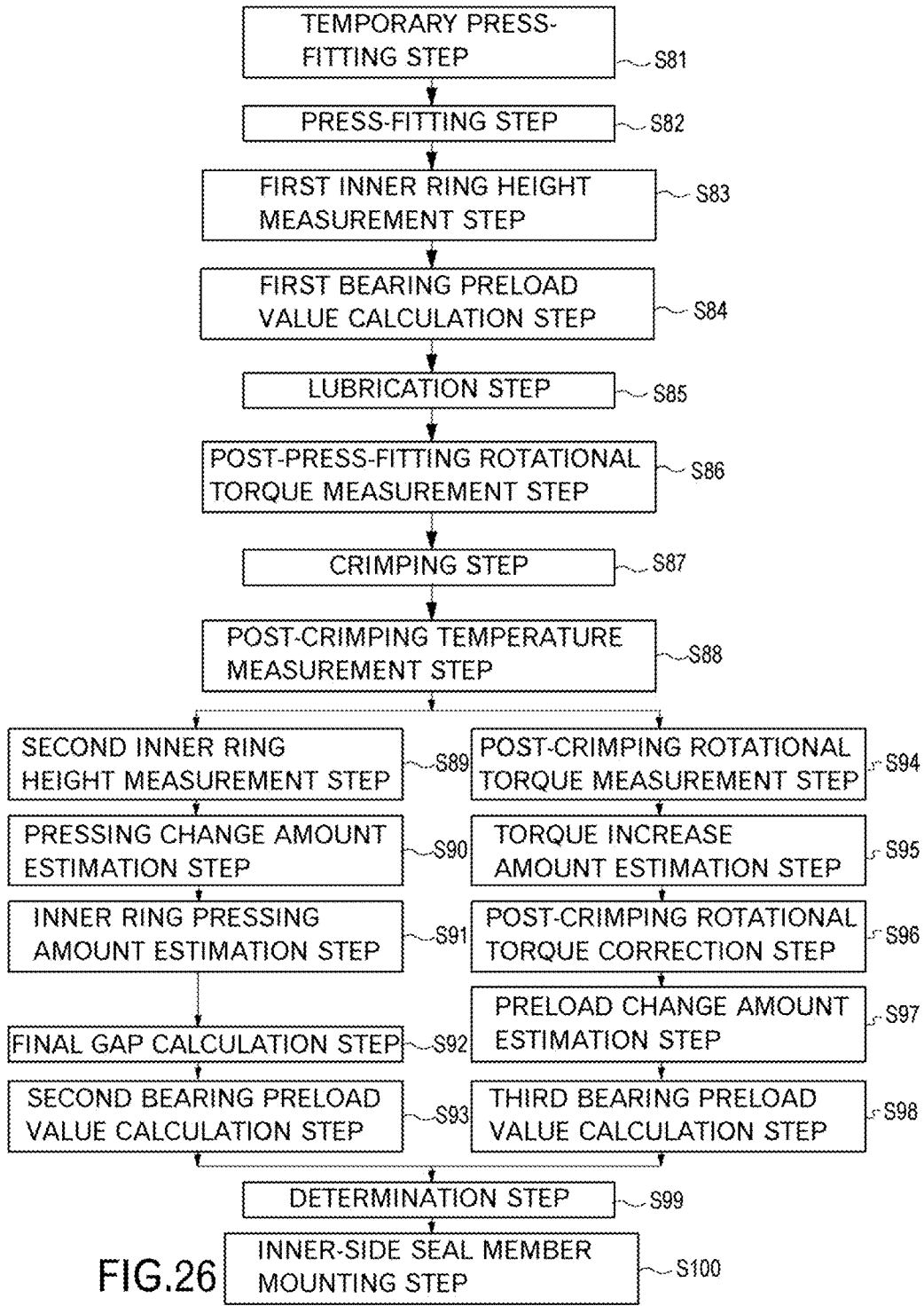
FIG. 26 is a diagram illustrating a process of the preload inspection method according to a sixth embodiment.

As illustrated in FIG. 26, the preload inspection method according to the present embodiment includes a temporary press-fitting step (S81), a press-fitting step (S82), a first inner ring height measurement step (S83), a first bearing preload value calculation step (S84), a lubrication step (S85), a post-press-fitting rotational torque measurement step (S86), a crimping step (S87), a post-crimping temperature measurement step (S88), a second inner ring height measurement step (S89), a pressing change amount estimation step (S90), an inner ring pressing amount estimation step (S91), a final gap calculation step (S92), a second bearing preload value calculation step (S93), a post-crimping rotational torque measurement step (S94), a torque increase amount estimation step (S95), a post-crimping rotational torque correction step (S96), a preload change amount estimation step (S97), a third bearing preload value calculation step (S98), a determination step (S99), and an inner-side seal member mounting step (S100). Each step of the preload inspection method will be described below.

(Temporary Press-Fitting Step)

Since this step is similar to that of the first embodiment, description of this step will be omitted.

(Press-Fitting Step)

After the temporary press-fitting step (S81), the press-fitting step (S82) is performed. As illustrated in FIG. 4, in the press-fitting step (S82), the inner ring 4 is press-fitted into the small-diameter step portion 3a to a position where the outer-side end surface 4c of the inner ring 4 abuts on the shoulder portion 3e of the hub ring 3.

(First Inner Ring Height Measurement Step)

The first inner ring height measurement step (S83) is performed after the press-fitting step (S82). As illustrated in FIG. 4, after completion of press-fitting of the inner ring 4 into the small-diameter step portion 3a, the first inner ring height H1, which is an axial dimension between the outer-side end surface 3g of the hub ring 3 and the inner-side end surface 4b of the inner ring 4 after the press-fitting of the inner ring 4, is measured. Further, a value obtained by subtracting the first inner ring height H1 from the axial dimension H0 is subtracted from the axial positive gap G0 between a raceway surface and a rolling body measured in the temporary press-fitting step (S81) to obtain the axial negative gap G1 between a raceway surface and a rolling body after the press-fitting of the inner ring 4 (G1=G0−(H0−H1)).

(First Bearing Preload Value Calculation Step)

Since this step is similar to that of the first embodiment, description of this step will be omitted.

(Lubrication Step)

Since this step is similar to that of the first embodiment, description of this step will be omitted.

(Post-Press-Fitting Rotational Torque Measurement Step)

Since this step is similar to that of the first embodiment, description of this step will be omitted.

(Crimping Step)

Since this step is similar to that of the first embodiment, description of this step will be omitted.

(Post-Crimping Temperature Measurement Step)

Figure 27:
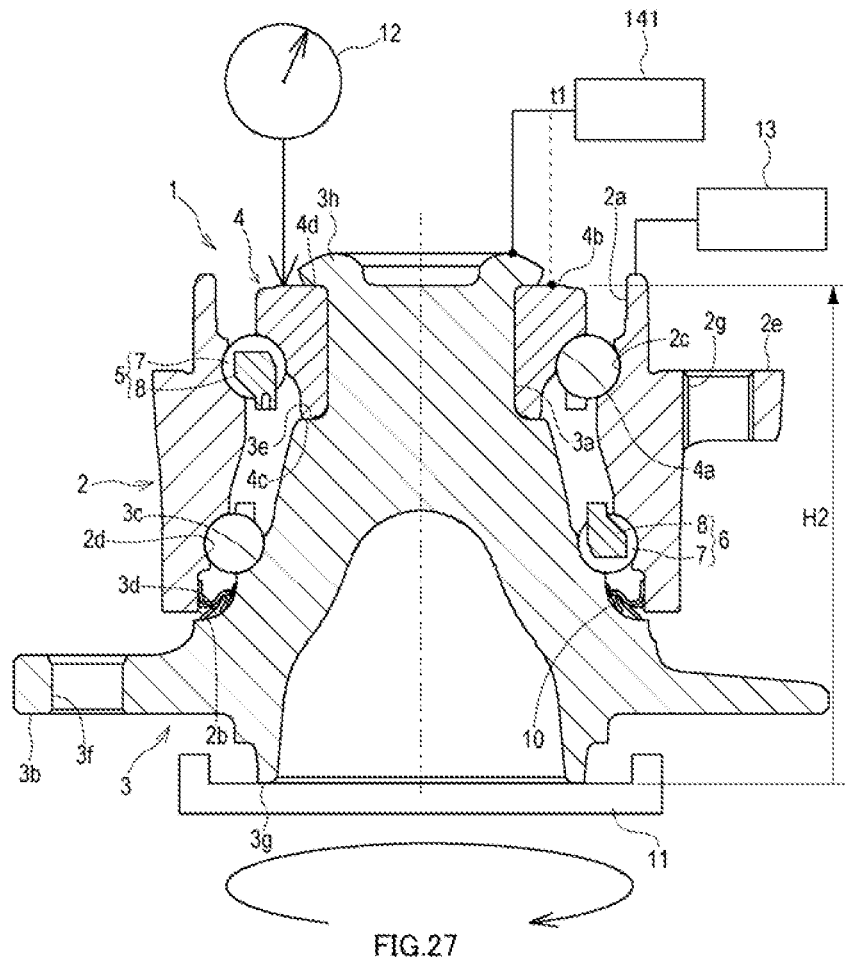
FIG. 27 is a side cross-sectional view illustrating the bearing device for a vehicle wheel in a state where the small-diameter step portion of the hub ring is crimped to the inner ring.

The post-crimping temperature measurement step (S88) is performed after the crimping step (S87). In the post-crimping temperature measurement step (S88), as illustrated in FIG. 27, a temperature t1 of the crimped portions 3h and 4d in which an inner-side end portion of the small-diameter step portion 3a of the hub ring 3 is crimped to the inner-side end surface 4b of the inner ring 4 is measured. The temperature t1 is measured by a temperature measuring instrument 141.

In measurement of temperature of the crimped portions 3h and 4d in the post-crimping temperature measurement step (S88), for example, it is preferable to provide the temperature measuring instrument 14 for measuring temperature of the crimped portions 3h and 4d in a part of a transfer device for transferring the bearing device for a vehicle wheel 1 being assembled with respect to a crimping device for performing swinging crimping processing. With such a configuration, temperature can be efficiently measured during a step of transferring the bearing device for a vehicle wheel 1 being assembled from a crimping device toward a next step after the crimping processing. As the temperature measuring instrument 141, a contact type and a non-contact type ones can be used. Note that a portion where the temperature measurement is performed in the post-crimping temperature measurement step (S88) may be any portion as long as the portion is where influence of a temperature increase due to the crimping processing can be appropriately grasped, and may be the inner-side end surface 4b of the inner ring 4.

Then, after the post-crimping temperature measurement step (S88), the second inner ring height measurement step (S89) and the post-crimping rotational torque measurement step (S94) are performed. Whichever of timings of performing the second inner ring height measurement step (S89) and the post-crimping rotational torque measurement step (S94) can come first.

Here, first, a series of the steps (S89) to (S93) following the second inner ring height measurement step (S89) will be described. Each of the steps (S89) to (S93) is a step related to a preload inspection method by what is called a gap method.

(Second Inner Ring Height Measurement Step)

The second inner ring height measurement step (S89) is performed after the post-crimping temperature measurement step (S88). In the second inner ring height measurement step (S89), as illustrated in FIG. 27, a second inner ring height H2, which is an axial dimension between the outer-side end surface 3g of the hub ring 3 and the inner-side end surface 4b of the inner ring 4 after the crimping processing, is measured. Then, a pressing amount D of the inner ring 4, which is a value obtained by subtracting the second inner ring height H2 from the first inner ring height H1, is calculated (D=H1−H2). The pressing amount D of the inner ring 4 indicates a movement amount of the inner ring 4 in the axial direction from completion of the press-fitting of the inner ring 4 to completion of the crimping processing of the small-diameter step portion 3a.

(Pressing Change Amount Estimation Step)

After the second inner ring height measurement step (S89), the pressing change amount estimation step (S90) is performed. In the pressing change amount estimation step (S90), a pressing amount decrease amount ΔD, which is a change amount of the pressing amount D of the inner ring 4 due to a temperature increase during the crimping processing, is estimated based on the temperature t1 of the crimped portions 3h and 4d. In the bearing device for a vehicle wheel 1 after the crimping processing, since the hub ring 3 and the inner ring 4 expand due to a temperature increase, the pressing amount D of the inner ring 4 is smaller than that in a case where there is no temperature increase. An amount by which the pressing amount D becomes smaller is the pressing amount decrease amount ΔD. The pressing amount decrease amount ΔD can be estimated by, for example, applying the measured temperature t1 to a relationship between the temperature t1 of the crimped portions 3h and 4d and the pressing amount decrease amount ΔD obtained in advance by an experiment or the like. Note that the relationship between the temperature t1 of the crimped portions 3*h* and 4*d* and the pressing amount decrease amount ΔD can be obtained for each specification of the bearing device for a vehicle wheel 1.

(Inner Ring Pressing Amount Estimation Step)

The inner ring pressing amount estimation step (S91) is performed after the pressing change amount estimation step (S90). In the inner ring pressing amount estimation step (S91), the pressing amount D of the inner ring 4 is corrected based on the pressing amount decrease amount ΔD, and a corrected pressing amount Dh, which is the pressing amount D after correction, is estimated (Dh=D+ΔD)

(Final Gap Calculation Step)

After the inner ring pressing amount estimation step (S91), the final gap calculation step (S92) is performed. In the final gap calculation step (S92), a final gap G2 is calculated by subtracting a gap decrease amount ΔG calculated from the corrected pressing amount Dh of the inner ring 4 from the axial negative gap G1 before the crimping processing. (G2=G1−ΔG) The gap decrease amount ΔG can be estimated by applying the corrected pressing amount Dh measured to a relationship between the pressing amount D and the gap decrease amount ΔG obtained in advance by an experiment or the like. Note that the relationship between the pressing amount D and the gap decrease amount ΔG can be obtained for each specification of the bearing device for a vehicle wheel 1.

(Second Bearing Preload Value Calculation Step)

The second bearing preload value calculation step (S93) is performed after the final gap calculation step (S92). In the second bearing preload value calculation step (S93), the bearing preload value P2 applied to the bearing after the crimping processing is calculated by a gap method based on the final gap G2. The bearing preload value P2 is calculated by applying the final gap G2 to a relationship between a final gap and a bearing preload value in the bearing device for a vehicle wheel 1 which is obtained, in advance, by an experiment or the like. Note that the relationship between a final gap and a bearing preload value can be obtained for each specification of the bearing device for a vehicle wheel 1.

Next, a series of the steps (S94) to (S98) following the post-crimping rotational torque measurement step (S94) will be described. Each of the steps (S94) to (S98) is a step related to a preload inspection method by what is called a torque method. Note that, between each step included in a series of the steps (S89) to (S93) related to the preload inspection method by the gap method described above and each step included in a series of the steps (S94) to (S98) related to the preload inspection method by the torque method described below, each series of steps can be performed in parallel regardless of a performing timing that comes first or later.

(Post-Crimping Rotational Torque Measurement Step)

After the post-crimping temperature measurement step (S88), the post-crimping rotational torque measurement step (S94) is performed. In the post-crimping rotational torque measurement step (S94), rotational torque is measured in a state where a dynamic frictional force is generated between the inner members 3 and 4 and the outer member 2, as in the post-press-fitting rotational torque measurement step (S86). In the post-crimping rotational torque measurement step (S94), the torque measuring instrument 13 measures the second rotational torque Tb when the hub ring in which the small-diameter step portion 3*a* is crimped to the inner ring 4 and the outer ring are relatively rotated. However, as in the case of the post-press-fitting rotational torque measurement step (S86), it is preferable to rotate the hub ring 3 because variations in a rotational torque value measured when a rotational speed of the hub ring 3 changes are reduced.

The post-crimping temperature measurement step (S88) is preferably performed immediately before the post-crimping rotational torque measurement step (S94), and time from the post-crimping temperature measurement step (S88) to the post-crimping rotational torque measurement step (S94) is preferably as short as possible. By shortening the time from the post-crimping temperature measurement step (S88) to the post-crimping rotational torque measurement step (S94), it is possible to reduce a temperature decrease, and calculation accuracy of a third bearing preload value P3 to be described later can be improved.

(Torque Increase Amount Estimation Step)

The torque increase amount estimation step (S95) is performed after the post-crimping rotational torque measurement step (S94). In the torque increase amount estimation step (S95), an increase amount ΔTb of the second rotational torque Tb due to a temperature increase during the crimping processing is estimated based on temperature of the crimped portions 3*h* and 4*d* measured in the post-crimping temperature measurement step (S88).

Figure 28:
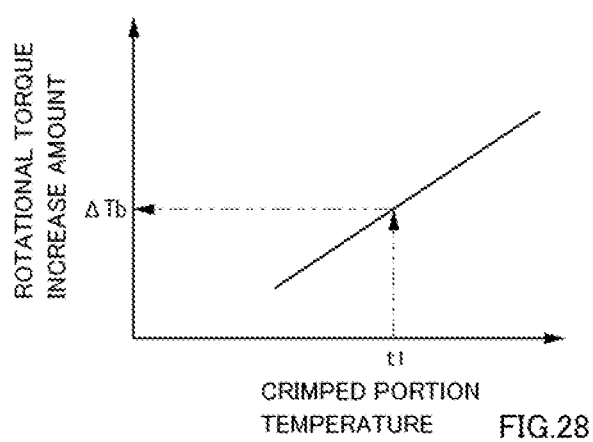
FIG. 28 is a diagram illustrating a relationship between crimped portion temperature and a rotational torque increase amount.

In this case, as illustrated in FIG. 28, the increase amount ΔTb is estimated by applying the temperature t1 of the crimped portions 3*h* and 4*d* to a relationship between the temperature of the crimped portions 3*h* and 4*d* and an increase amount of the second rotational torque Tb obtained in advance by an experiment or the like. Note that the relationship between the temperature of the crimped portions 3*h* and 4*d* and an increase amount in the second rotational torque Tb can be obtained for each specification of the bearing device for a vehicle wheel 1.

(Post-Crimping Rotational Torque Correction Step)

After the torque increase amount estimation step (S95), the post-crimping rotational torque correction step (S96) is performed. In the post-crimping rotational torque correction step (S96), the second rotational torque Tb is corrected based on the increase amount ΔTb of the second rotational torque Tb estimated in the torque increase amount estimation step (S95). Specifically, the third rotational torque Tc (Tc=Tb−ΔTb), which is the second rotational torque Tb after correction, is calculated by subtracting the increase amount ΔTb from a value of the second rotational torque Tb.

(Preload Change Amount Estimation Step)

The preload change amount estimation step (S97) is performed after the post-crimping rotational torque correction step (S96). In the preload change amount estimation step (S97), a relationship (line R) between a bearing preload and rotational torque as illustrated in FIG. 15 is obtained in advance by an experiment or the like, and the first rotational torque Ta and the third rotational torque Tc are applied to this relationship to calculate the differential torque ΔT. Then, in the preload change amount estimation step (S97), the preload change amount ΔP caused by the crimping processing is estimated from the relationship illustrated in FIG. 15 based on the calculated differential torque ΔT.

In this case, as illustrated in FIG. 15, the preload change amount ΔP is calculated by applying the differential torque ΔT to a relationship between a bearing preload of the bearing device for a vehicle wheel 1 and rotational torque of the bearing which is obtained, in advance, by an experiment or the like. Note that the relationship between a bearing preload and rotational torque of the bearing can be obtained for each specification of the bearing device for a vehicle wheel 1.

(Third Bearing Preload Value Calculation Step)

After the preload change amount estimation step (S97), the third bearing preload value calculation step (S98) is performed. In the third bearing preload value calculation step (S98), the third bearing preload value P3 is calculated by adding the preload change amount ΔP to the first bearing preload value P1.

(Determination Step)

After the second bearing preload value calculation step (S93) and the third bearing preload value calculation step (S98) are completed, the determination step (S99) is performed. In the determination step (S99), appropriateness or inappropriateness of a preload applied to the bearing device for a vehicle wheel 1 is determined on the basis of three conditions of 1) whether or not the second bearing preload value P2 is within a predetermined threshold, 2) whether or not the third bearing preload value P3 is within a predetermined threshold, and 3) whether or not a relative difference between the second bearing preload value P2 and the third bearing preload value P3 is within a predetermined threshold.

In the preload inspection method according to the present embodiment, when the second bearing preload value P2 is calculated, the final gap G3 is corrected in consideration of a temperature increase at the time of crimping processing. For this reason, the second bearing preload value P2 can be accurately calculated based on the gap method, and determination accuracy based on the second bearing preload value P2 is improved in the determination step (S99).

Further, in the preload inspection method according to the present embodiment, when the third bearing preload value P3 is calculated based on post-press-fitting rotational torque and post-crimping rotational torque, the preload change amount ΔP is corrected in consideration of a temperature increase during the crimping processing. For this reason, the third bearing preload value P3 can be accurately calculated based on the torque method, and determination accuracy based on the third bearing preload value P3 is improved in the determination step (S99).

Furthermore, in the preload inspection method according to the present embodiment, the second bearing preload value P2 calculated by what is called a gap method and the third bearing preload value P3 calculated by what is called a torque method are collated with each other, and both the values are confirmed to fall within a range of a preset relative difference, so that a preload value applied to the bearing of the bearing device for a vehicle wheel 1 can be verified with higher accuracy. As a result, in the determination step (S99), whether or not a preload range of the bearing device for a vehicle wheel 1 is appropriate can be verified with higher accuracy than before, so that the bearing device for a vehicle wheel 1 having a secured bearing life can be stably supplied.

(Inner-Side Seal Member Mounting Step)

The assembling step of the bearing device for a vehicle wheel 1 is completed as the inner-side seal member mounting step (S100) is performed after the determination step (S99). That is, the inner-side seal member mounting step (S100) is a part of the assembly method for the bearing device for a vehicle wheel 1. As illustrated in FIG. 9, in the inner-side seal member mounting step (S100), the inner-side seal member 9 is mounted between an inner-side end portion of the outer ring 2 and an inner-side end portion of the inner ring 4 as the inner-side seal member 9 is fitted to the inner-side opening portion 2a of the outer ring 2.

When the inner-side seal member 9 is mounted before the crimping step (S87), the sliding resistance between the outer ring 2 and the inner ring 4 of the inner-side seal member 9 changes depending on the degree of crimping of the hub ring 3 in the crimping step (S87). Further, when the inner-side seal member 9 is mounted before the post-crimping rotational torque measurement step (S94) even after the crimping step (S87), the sliding resistance between the outer ring 2 and the inner ring 4 of the inner-side seal member 9 changes depending on a mounting state of the inner-side seal member 9.

Therefore, when the inner-side seal member 9 is mounted before the crimping step (S87) or the post-crimping rotational torque measurement step (S94), there may be influence on variations in the second rotational torque Tb measured in the post-crimping rotational torque measurement step (S94). Similarly, in a case where the inner-side seal member 9 is mounted before the post-press-fitting rotational torque measurement step (S86), the mounting state of the inner-side seal member 9 may affect variations in the first rotational torque Ta measured in the post-press-fitting rotational torque measurement step (S86).

However, in the present embodiment, the inner-side seal member mounting step (S100) is performed after the post-crimping rotational torque measurement step (S94). Therefore, when the first rotational torque Ta and the second rotational torque Tb of the bearing device for a vehicle wheel 1 are measured in the post-press-fitting rotational torque measurement step (S86) and the post-crimping rotational torque measurement step (S94), variations in the rotational torque due to the influence of the inner-side seal member 9 are not generated, and the rotational torque of the bearing device for a vehicle wheel 1 can be measured with high accuracy.

(Pre-Crimping Temperature Measurement Step)

Figure 29:
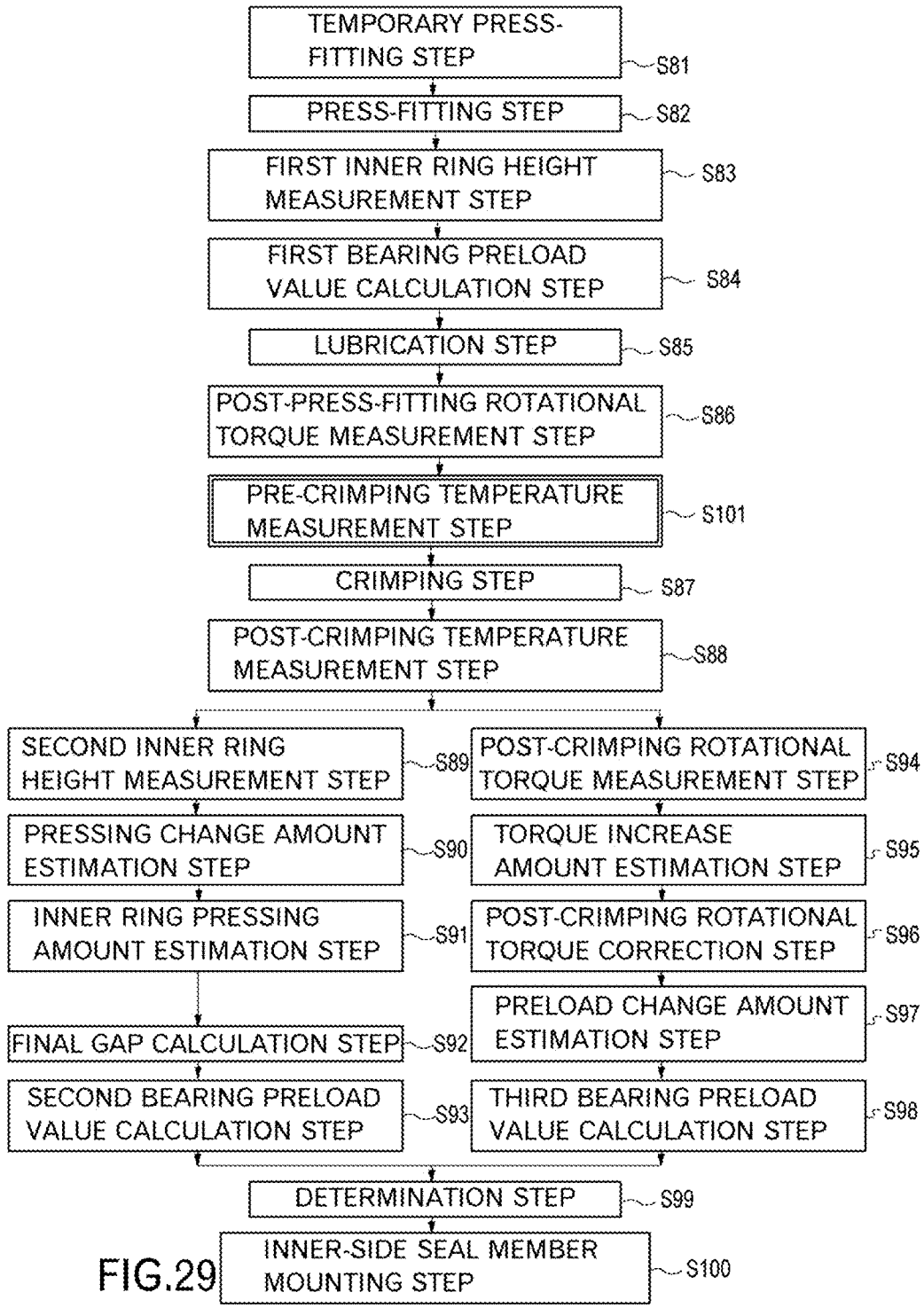
FIG. 29 is a diagram illustrating a process of a first example of the preload inspection method in a case where a pre-crimping temperature measurement step is performed.
Figure 30:
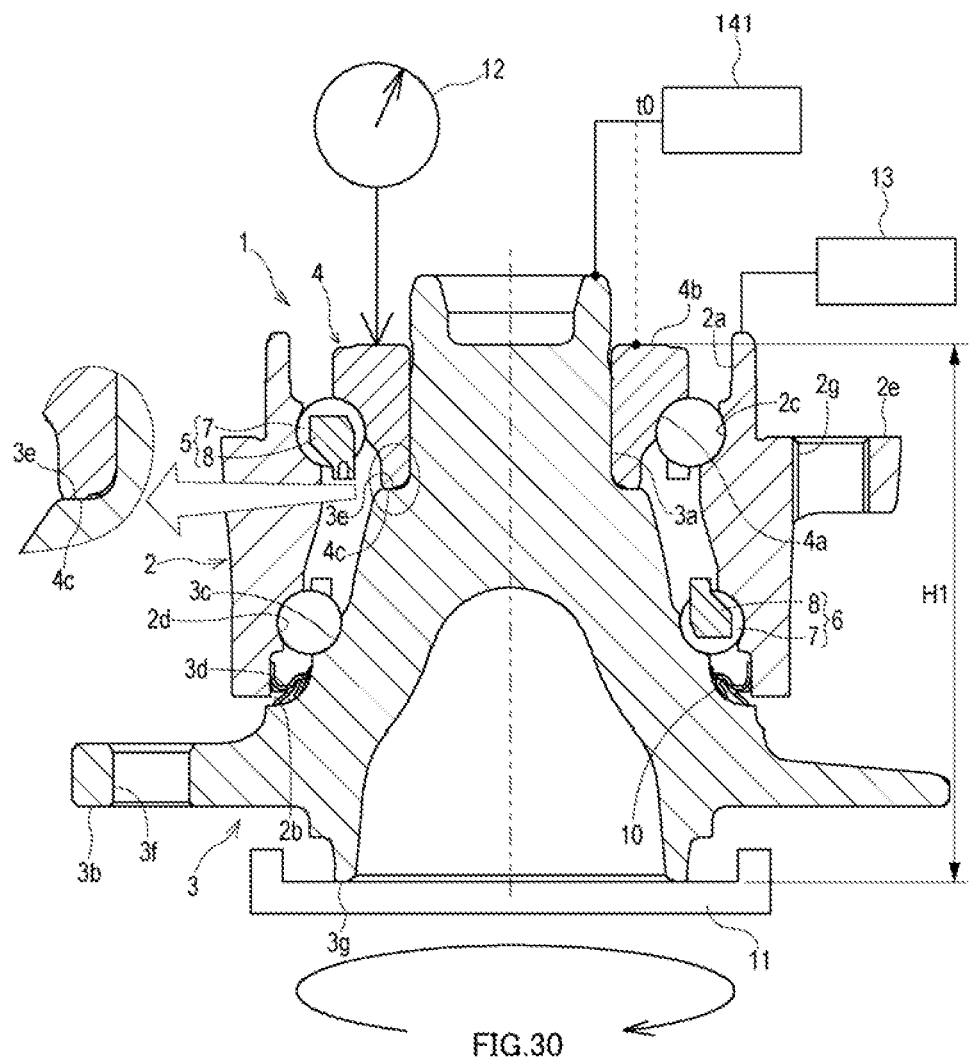
FIG. 30 is a side cross-sectional view illustrating the bearing device for a vehicle wheel in a state where temperature of a portion corresponding to the crimped portion before the crimping processing is measured.

In the preload inspection method of the bearing device for a vehicle wheel 1, as illustrated in FIG. 29, a pre-crimping temperature measurement step (S101) is preferably performed before the crimping step (S87). In the pre-crimping temperature measurement step (S101), as illustrated in FIG. 30, the temperature t0 of a portion corresponding to the crimped portions 3h and 4d before an inner-side end portion of the small-diameter step portion 3a of the hub ring 3 is crimped to the inner-side end surface 4b of the inner ring 4 is measured.

In the preload inspection method of the bearing device for a vehicle wheel 1 illustrated in FIG. 2, only the temperature t1 of the crimped portions 3h and 4d after crimping is measured. In this case, a temperature increase of the crimped portions 3h and 4d after crimping is calculated assuming that temperature of a portion corresponding to the crimped portions 3h and 4d before crimping of the bearing device for a vehicle wheel 1 is equal to ambient temperature (normal temperature) of the bearing device for a vehicle wheel 1. However, the ambient temperature of the bearing device for a vehicle wheel 1 changes depending on a difference in installation environments (country, region, season, time, and the like) of an inspection device.

On the other hand, as in the preload inspection method of the bearing device for a vehicle wheel 1 illustrated in FIG. 29, by calculating a temperature increase value of the crimped portions 3h and 4d after the crimping processing as configuration of accurately grasping temperature of a portion corresponding to the crimped portions 3h and 4d before the crimping processing, it is possible to further improve accuracy of the preload inspection of the bearing device for a vehicle wheel 1.

Figure 31:
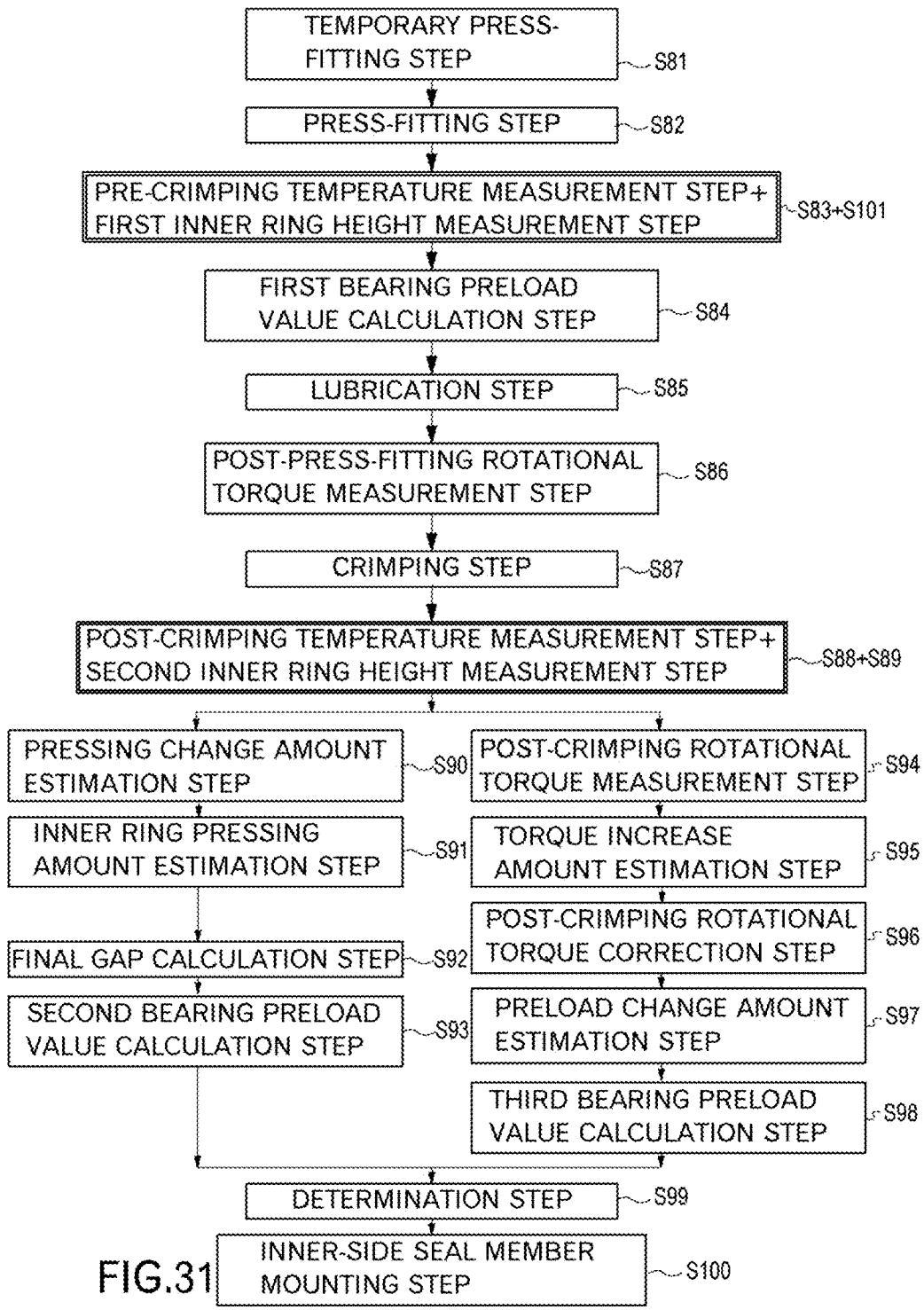
FIG. 31 is a diagram illustrating a process of a second example of the preload inspection method in a case where the pre-crimping temperature measurement step is performed.

Further, as illustrated in FIG. 31, the pre-crimping temperature measurement step (S101) is more preferably performed simultaneously with the first inner ring height measurement step (S83). Such a configuration can be easily realized by providing the temperature measuring instrument 141 in a part of a measuring instrument for measuring the first inner ring height H1 in the first inner ring height measurement step (S83). With such a configuration, it is possible to measure the first inner ring height H1 of the bearing device for a vehicle wheel 1 being assembled and measure temperature of a portion corresponding to the crimped portions 3h and 4d at the same time, and it is possible to shorten a series of steps of preload inspection while improving inspection accuracy. Note that, as the temperature measuring instrument, contact type and non-contact type ones can be used.

Furthermore, as illustrated in FIG. 31, by performing the pre-crimping temperature measurement step (S101) before the lubrication step (S85) and the post-press-fitting rotational torque measurement step (S86), influence of a temperature change of the bearing device for a vehicle wheel 1 caused by performance of the lubrication step (S85) and the post-press-fitting rotational torque measurement step (S86) can also be eliminated. In this manner, estimation accuracy of a bearing preload value can be improved as compared with a case where the pre-crimping temperature measurement step (S101) is performed after the lubrication step (S85) and the post-press-fitting rotational torque measurement step (S86) (see FIG. 29).

Furthermore, as illustrated in FIG. 31, the post-crimping temperature measurement step (S88) is more preferably performed simultaneously with the second inner ring height measurement step (S89). As described above, if the temperature measuring instrument 141 is provided in a part of the measuring instrument for measuring the first inner ring height H1 in the first inner ring height measurement step (S83), the second inner ring height H2 can be measured, and, at the same time, temperature of the crimped portions 3h and 4d can be measured for the bearing device for a vehicle wheel 1 being assembled. This makes it possible to further shorten a series of steps of the preload inspection.

Note that, although the bearing device for a vehicle wheel 1 for a driven wheel is described in each of the embodiments, the preload inspection method of each of the embodiments can also be applied to a bearing device for a vehicle wheel for a driving wheel having the specification in which crimping processing is performed for a hub ring.

Although the embodiments of the present invention are described above, the present invention is not limited to such embodiments in any way, and the embodiments are merely an example. As a matter of course, the present invention can be implemented in various forms without departing from the gist of the present invention. The scope of the present invention is indicated by the description of the claims, and further includes the equivalent meaning to and all changes within the scope of the claims.

INDUSTRIAL APPLICABILITY

The present invention can be used for a preload inspection method of a bearing device for a vehicle wheel.

REFERENCE SIGNS LIST 1 bearing device for a vehicle wheel
2 outer ring
2c outer raceway surface (on inner side)
2d outer raceway surface (on outer side)
3 hub ring
3a small-diameter step portion
3c inner raceway surface
4 inner ring
4a inner raceway surface
5 inner-side ball row
6 outer-side ball row
7 ball
9 inner-side seal member
P1 first bearing preload value
P2 second bearing preload value
S02 press-fitting step
S03 first bearing preload value calculation step
S04 lubrication step
S05 post-press-fitting rotational torque measurement step
S06 crimping step
S07 post-crimping rotational torque measurement step
S08 second bearing preload value calculation step
S09 determination step
Ta post-press-fitting rotational torque
Tb post-crimping rotational torque
ΔT differential torque
ΔP preload change amount

The invention claimed is:

1. A preload inspection method for a bearing device for a vehicle wheel including:
an outer member having a plurality of rows of outer raceway surfaces on an inner periphery;
an inner member including a hub ring that has a small-diameter step portion extending in an axial direction on an outer periphery and an inner ring that is press-fitted into the small-diameter step portion of the hub ring, the inner member having a plurality of rows of inner raceway surfaces facing the plurality of rows of outer raceway surfaces; and
a plurality of rows of rolling bodies rollably accommodated between both raceway surfaces of the outer member and the inner member, the preload inspection method comprising:
a press-fitting step of press-fitting the inner ring into the small-diameter step portion of the hub ring to a position where the inner ring abuts on the hub ring in the axial direction;
a first bearing preload value calculation step of calculating a first bearing preload value of the bearing device for a vehicle wheel based on an axial negative gap between the both raceway surfaces and the rolling body after the press-fitting step;
a post-press-fitting rotational torque measurement step of measuring post-press-fitting rotational torque of the bearing device for a vehicle wheel when the inner member and the outer member are relatively rotated after the press-fitting step;
a crimping step of crimping an inner-side end portion of the small-diameter step portion to the inner ring after the post-press-fitting rotational torque measurement step;
a post-crimping rotational torque measurement step of measuring post-crimping rotational torque of the bearing device for a vehicle wheel when the inner member and the outer member are relatively rotated after the crimping step;
a second bearing preload value calculation step of calculating a second bearing preload value by adding, to the first bearing preload value, a preload change amount between after the press-fitting step and after the crimping step, the preload change amount being obtained based on differential torque between the post-press-fitting rotational torque and the post-crimping rotational torque; and a determination step of determining appropriateness or inappropriateness of a preload applied to the bearing device for a vehicle wheel depending on whether or not the second bearing preload value is within a range of a reference value.

2. The preload inspection method for a bearing device for a vehicle wheel according to claim 1, wherein
the reference value is set in consideration of a variation in rotational torque caused by crimping of the small-diameter step portion to the inner ring.

3. The preload inspection method for a bearing device for a vehicle wheel according to claim 1, wherein
in the second bearing preload value calculation step, the preload change amount is obtained from the differential torque by using a relationship between rotational torque and a preload according to ambient temperature.

4. The preload inspection method for a bearing device for a vehicle wheel according to claim 1, wherein
in the second bearing preload value calculation step, the preload change amount is obtained from the differential torque by using a relationship between rotational torque and a preload according to surface temperature of the bearing device for a vehicle wheel.

5. The preload inspection method for a bearing device for a vehicle wheel according to claim 4, wherein
the surface temperature of the bearing device for a vehicle wheel is measured by a contact type temperature sensor or a non-contact type temperature sensor.

6. The preload inspection method for a bearing device for a vehicle wheel according to claim 1, the preload inspection method further comprising:
a rotational torque correction step of correcting the post-crimping rotational torque based on a temperature increase amount of the inner ring due to the crimping processing and calculating corrected post-crimping rotational torque between the post-crimping rotational torque measurement step and the second bearing preload value calculation step, wherein
in the second bearing preload value calculation step, a preload change amount between after the press-fitting step and after the crimping step is obtained based on a difference between the post-press-fitting rotational torque and the corrected post-crimping rotational torque, and a second bearing preload value is calculated by adding the preload change amount to the first bearing preload value.

7. The preload inspection method for a bearing device for a vehicle wheel according to claim 6, wherein
in the crimping step, crimping processing time, which is time required for the crimping processing, is measured, and,
in the rotational torque correction step,
an increase amount of the post-crimping rotational torque caused by a temperature increase of the inner ring due to the crimping processing is obtained based on the crimping processing time, and
the corrected post-crimping rotational torque is calculated by subtracting an increase amount of the post-crimping rotational torque from the post-crimping rotational torque.

8. The preload inspection method for a bearing device for a vehicle wheel according to claim 7, wherein
in the rotational torque correction step,
an increase amount of the post-crimping rotational torque is obtained by using a relationship between the crimping processing time and an increase amount of the post-crimping rotational torque corresponding to ambient temperature during the crimping processing among relationships between the crimping processing time and an increased amount of the post-crimping rotational torque obtained for a plurality of ambient temperatures.

9. The preload inspection method for a bearing device for a vehicle wheel according to claim 7, the preload inspection method further comprising a processing time determination step of determining whether or not the crimping processing time exceeds a predetermined upper limit value after completion of the crimping processing, and discharging a bearing device for a vehicle wheel in a case where the crimping processing time is determined to exceed a predetermined upper limit value.

10. The preload inspection method for a bearing device for a vehicle wheel according to claim 8, the preload inspection method further comprising a processing time determination step of determining whether or not the crimping processing time exceeds a predetermined upper limit value after completion of the crimping processing, and discharging a bearing device for a vehicle wheel in a case where the crimping processing time is determined to exceed a predetermined upper limit value.

11. A rotational torque inspection method for a bearing device for a vehicle wheel according to claim 1, wherein
in the post-press-fitting rotational torque measurement step and the post-crimping rotational torque measurement step, the rotational torque is measured by relatively rotating the inner member and the outer member at a rotational speed of 60 rotations/min or lower.

12. The preload inspection method for a bearing device for a vehicle wheel according to claim 1, wherein
a space between the hub ring and the outer member is filled with grease, the preload inspection method further comprising a lubrication step performed at least between the press-fitting step and the post-press-fitting rotational torque measurement step, the lubrication step being a step of relatively rotating the inner member and the outer member to lubricate the rolling body with the grease.

13. The preload inspection method for a bearing device for a vehicle wheel according to claim 1, the preload inspection method further comprising:
a temperature measurement step of measuring temperature of a crimped portion of the hub ring and the inner ring after completion of the crimping processing; and
a rotational torque correction step of correcting the post-crimping rotational torque based on temperature of the crimped portion measured in the temperature measurement step to calculate corrected post-crimping rotational torque, wherein
in the second bearing preload value calculation step, a preload change amount between after the press-fitting step and after the crimping step is obtained based on a difference between the post-press-fitting rotational torque and the corrected post-crimping rotational torque, and a second bearing preload value is calculated by adding the preload change amount to the first bearing preload value.

14. The preload inspection method for a bearing device for a vehicle wheel according to claim 13, wherein
in the rotational torque correction step,
temperature of the inner raceway surface of the inner ring after completion of the crimping processing is calculated from temperature of the crimped portion measured in the temperature measurement step by using a relationship between temperature of the crimped portion and temperature of the inner raceway surface of the inner ring, temperature of the inner raceway surface of the inner ring when the post-crimping rotational torque is measured is calculated by using a relationship between temperature of the inner raceway surface of the inner ring and time from elapsed time from measurement of temperature of the crimped portion to measurement of the post-crimping rotational torque and temperature of the inner raceway surface of the inner ring after completion of the crimping processing, a rotational torque change amount due to a temperature change is obtained based on differential temperature between temperature of the inner raceway surface of the inner ring when the post-crimping rotational torque is measured and ambient temperature, and the corrected post-crimping rotational torque is calculated by subtracting the rotational torque change amount from the post-crimping rotational torque.

15. The preload inspection method for a bearing device for a vehicle wheel according to claim 13, wherein
in the temperature measurement step,
temperature of the crimped portion is measured by a temperature sensor attached to a crimping machine that performs the crimping processing.

16. The preload inspection method for a bearing device for a vehicle wheel according to claim 14, wherein
in the temperature measurement step,
temperature of the crimped portion is measured by a temperature sensor attached to a crimping machine that performs the crimping processing.

17. The preload inspection method for a bearing device for a vehicle wheel according to claim 15, wherein
the temperature sensor is a contact type temperature sensor or a non-contact type temperature sensor.

18. The preload inspection method for a bearing device for a vehicle wheel according to claim 16, wherein
the temperature sensor is a contact type temperature sensor or a non-contact type temperature sensor.

19. The preload inspection method for a bearing device for a vehicle wheel according to claim 1, the preload inspection method further comprising a crimping processing degree measurement step of measuring crimping processing degree of a crimped portion formed in the small-diameter step portion in the crimping step, wherein
the determining step includes:
a first determination step of determining appropriateness or inappropriateness of a preload applied to the bearing device for a vehicle wheel depending on whether or not the second bearing preload value falls within a range of a reference value; and
a second determination step of collating the crimping processing degree with a value of the differential torque, and determining presence or absence of a crimping abnormality depending on whether or not a value of the differential torque with respect to the crimping processing degree falls within a range of a torque reference value.

20. The preload inspection method for a bearing device for a vehicle wheel according to claim 19, wherein
the crimping processing degree includes at least one of a height dimension in the axial direction of the crimped portion and an outer diameter dimension in a direction orthogonal to the axial direction of the crimped portion.

21. The preload inspection method for a bearing device for a vehicle wheel according to claim 19, wherein
in the crimping processing degree measurement step,
the crimping processing degree is measured by a contact type measuring instrument that performs measurement by bringing a contact into contact with the crimped portion.

22. The preload inspection method for a bearing device for a vehicle wheel according to claim 20, wherein
in the crimping processing degree measurement step,
the crimping processing degree is measured by a contact type measuring instrument that performs measurement by bringing a contact into contact with the crimped portion.

23. The preload inspection method for a bearing device for a vehicle wheel according to claim 19, wherein
in the crimping processing degree measurement step,
the crimping processing degree is measured by a non-contact type measuring instrument that performs measurement without being in contact with the crimped portion.

24. The preload inspection method for a bearing device for a vehicle wheel according to claim 20, wherein
in the crimping processing degree measurement step,
the crimping processing degree is measured by a non-contact type measuring instrument that performs measurement without being in contact with the crimped portion.

25. A preload inspection method for a bearing device for a vehicle wheel including:
an outer member having a plurality of rows of outer raceway surfaces on an inner periphery;
an inner member including a hub ring that has a small-diameter step portion extending in an axial direction on an outer periphery and an inner ring that is press-fitted into the small-diameter step portion of the hub ring, the inner member having a plurality of rows of inner raceway surfaces facing the plurality of rows of outer raceway surfaces; and
a plurality of rows of rolling bodies rollably accommodated between both raceway surfaces of the outer member and the inner member, the preload inspection method comprising:
a press-fitting step of press-fitting the inner ring into the small-diameter step portion of the hub ring to a position where the inner ring abuts on the hub ring in the axial direction;
a first inner ring height measurement step of measuring a first inner ring height from an outer-side end portion of the hub ring to an inner-side end portion of the inner ring after the press-fitting step;
a first bearing preload value calculation step of measuring an axial negative gap between the both raceway surfaces and the rolling body after the press-fitting step and calculating a bearing preload value of the bearing device for a vehicle wheel based on the axial negative gap;
a post-press-fitting rotational torque measurement step of measuring post-press-fitting rotational torque of the bearing device for a vehicle wheel when the inner member and the outer member are relatively rotated after the press-fitting step;
a crimping step of crimping an inner-side end portion of the small-diameter step portion to the inner ring after the first inner ring height measurement step and the post-press-fitting rotational torque measurement step;

a post-crimping temperature measurement step of measuring temperature of a crimped portion between the small-diameter step portion and the inner ring after the crimping step;

a second inner ring height measurement step of measuring a second inner ring height from an outer-side end portion of the hub ring to an inner-side end portion of the inner ring after the crimping step;

an inner ring pressing amount estimation step of calculating a pressing amount of the inner ring from a difference between the first inner ring height and the second inner ring height, correcting a pressing amount of the inner ring based on temperature of the crimped portion, and estimating a corrected pressing amount of the inner ring with respect to the hub ring;

a final gap calculation step of calculating a gap decrease amount between the both raceway surfaces and the rolling body based on the estimated corrected pressing amount of the inner ring, and calculating a final gap between the inner ring and the hub ring based on the gap decrease amount and the axial negative gap;

a second bearing preload value calculation step of calculating a second bearing preload value of the bearing device for a vehicle wheel based on the calculated final gap;

a post-crimping rotational torque measurement step of measuring post-crimping rotational torque of the bearing device for a vehicle wheel when the inner member and the outer member are relatively rotated after the crimping step;

a post-crimping rotational torque correction step of estimating a torque increase amount caused by a temperature change in the post-crimping rotational torque based on temperature of the crimped portion after the crimping step and correcting the post-crimping rotational torque by subtracting the torque increase amount from the post-crimping rotational torque;

a preload change amount estimation step of calculating differential torque between the post-press-fitting rotational torque and the post-crimping rotational torque after correction and estimating a preload change amount caused by the crimping processing based on the differential torque;

a third bearing preload value calculation step of calculating a third bearing preload value by adding the preload change amount to the first bearing preload value; and a determination step of determining appropriateness or inappropriateness of a preload applied to the bearing device for a vehicle wheel based on whether or not each of the second bearing preload value and the third bearing preload value is within a predetermined threshold and whether or not a relative difference between the second bearing preload value and the third bearing preload value is within a predetermined threshold.

26. The preload inspection method for a bearing device for a vehicle wheel according to claim 25, wherein
temperature of the crimped portion is set to temperature of the inner ring constituting the crimped portion.

27. The preload inspection method for a bearing device for a vehicle wheel according to claim 25, the preload inspection method further comprising:
a pre-crimping temperature measurement step of measuring temperature of the crimped portion before the crimping step, wherein
a temperature change amount between temperature of a portion corresponding to the crimped portion before the crimping step and temperature of the crimped portion after the crimping step; and
the temperature change amount is used as temperature of the crimped portion in the inner ring pressing amount estimation step and the torque increase amount estimation step.

28. The preload inspection method for a bearing device for a vehicle wheel according to claim 26, the preload inspection method further comprising:
a pre-crimping temperature measurement step of measuring temperature of the crimped portion before the crimping step, wherein
a temperature change amount between temperature of a portion corresponding to the crimped portion before the crimping step and temperature of the crimped portion after the crimping step; and
the temperature change amount is used as temperature of the crimped portion in the inner ring pressing amount estimation step and the torque increase amount estimation step.

29. The preload inspection method for a bearing device for a vehicle wheel according to claim 27, wherein
the pre-crimping temperature measurement step is performed simultaneously in the first inner ring height measurement step.

30. The preload inspection method for a bearing device for a vehicle wheel according to claim 28, wherein
the pre-crimping temperature measurement step is performed simultaneously in the first inner ring height measurement step.

31. The preload inspection method for a bearing device for a vehicle wheel according to claim 25, wherein
the post-crimping temperature measurement step is performed simultaneously in the second inner ring height measurement step.

32. The preload inspection method for a bearing device for a vehicle wheel according to claim 25, wherein
the post-crimping temperature measurement step is performed immediately before the post-crimping rotational torque measurement step.

* * * * *